(12) United States Patent
Yim

(10) Patent No.: US 8,374,495 B2
(45) Date of Patent: Feb. 12, 2013

(54) USER-CONFIGURABLE WATERPROOF CAMERA CASE

(75) Inventor: Wai Lam William Yim, Hong Kong (HK)

(73) Assignee: Sanwa Technologies Limited, Hong Kong (HK)

( * ) Notice: Subject to any disclaimer, the term of this patent is extended or adjusted under 35 U.S.C. 154(b) by 0 days.

(21) Appl. No.: 13/043,447

(22) Filed: Mar. 8, 2011

(65) Prior Publication Data

US 2011/0211820 A1 Sep. 1, 2011

Related U.S. Application Data

(63) Continuation-in-part of application No. 12/478,077, filed on Jun. 4, 2009, now Pat. No. 7,929,847.

(51) Int. Cl.
*G03B 17/08* (2006.01)

(52) U.S. Cl. .............................................. 396/29; 348/81
(58) Field of Classification Search .................... 396/27, 396/29; 348/81
See application file for complete search history.

(56) References Cited

U.S. PATENT DOCUMENTS

| | | | |
|---|---|---|---|
| 2006/0008261 A1* | 1/2006 | Watanabe et al. | 396/25 |
| 2006/0193615 A1* | 8/2006 | Funahashi et al. | 396/29 |
| 2009/0032420 A1* | 2/2009 | Zenzai | 206/316.2 |
| 2009/0110380 A1* | 4/2009 | Fantone et al. | 396/27 |

* cited by examiner

*Primary Examiner* — Rodney Fuller
*Assistant Examiner* — Fang-Chi Chang

(57) ABSTRACT

A user-configurable waterproof camera case includes a housing for sealingly holding different models of camera therein, an actuating shaft extending through an opening of the housing, a probe-carrying member connected to an inner end of the actuating shaft, and an adjustable probe carried by the probe-carrying member at a position engageable with an on/off button or a shutter button of the camera.

17 Claims, 31 Drawing Sheets

USER-CONFIGURABLE WATERPROOF CAMERA CASE

CROSS-REFERENCE TO RELATED APPLICATIONS

This application is a continuation-in-part (CIP) of U.S. patent application Ser. No. 12/478,077, filed on Jun. 4, 2009 now U.S. Pat. No. 7,929,847.

FIELD OF PATENT APPLICATION

The present patent application relates to a user-configurable waterproof camera case.

BACKGROUND

Conventional waterproof camera cases were designed to be used with dedicated cameras. There is a need to provide an improved waterproof camera case which can be configured by users and can be used with different models of cameras.

SUMMARY

According to one aspect, there is provided a user-configurable waterproof camera case including a housing for sealingly holding different models of camera therein; an actuating shaft extending through an opening of the housing; an actuator block connected to an inner end of the actuating shaft; a first member slidably connected to the actuator block along a first axis generally perpendicular to an axis of the actuating shaft; a second member slidably connected to the first member along a second axis generally perpendicular to the first axis; and an adjustable probe provided on the second member at a position engageable with a button of the camera.

In one embodiment, the connection between the actuator block and the first member and the connection between the first and second members are groove-and-protrusion connections. In another embodiment, the connection between the actuator block and the first member and the connection between the first and second members are slot-and-slider connections. In one embodiment, the probe includes a threaded portion threadably engaged with a nut for locking the probe in a fixed position relative to the actuator block. In one embodiment, each of the first and second members is in the form of a sliding block.

In one embodiment, one of the actuator block and the first member is formed with a first groove, and the other one of the actuator block and the first member is formed with a first protrusion slidably received in the first groove; and one of the first and second members is formed with a second groove, and the other one of the first and second members is formed with a second protrusion slidably received in the second groove. The first and second grooves and protrusions may be generally in the shape of a trapezoid or generally T-shaped in cross section. The actuator block and the second member may be generally H-shaped in cross section.

In one embodiment, the actuator block is formed with two slots, and the first member is formed with two sliders hanging from and slidable along the two slots of the actuator block respectively. The first member is formed with a slot, and the second member is formed with a slider hanging from and slidable along the slot of the first member.

In another embodiment, the actuator block is formed with two grooves along two opposite sides thereof, and the first member is formed with two sliders hanging from and slidable along the two grooves of the actuator block respectively. The first member is formed with a slot, and the second member is formed with a slider hanging from and slidable along the slot of the first member.

According to another aspect, there is provided a user-configurable waterproof camera case including a housing for sealingly holding different models of camera therein; an actuating shaft extending through an opening of the housing; an actuator block connected to an inner end of the actuating shaft; a sliding member slidably connected to the actuator block along a first axis generally perpendicular to an axis of the actuating shaft; and a sliding probe slidably connected to the sliding member along a second axis generally perpendicular to the first axis, the probe being adjustable to a position engageable with a button of the camera.

In one embodiment, the actuator block is formed with two slots, and the sliding member is formed with two sliders hanging from and slidable along the two slots of the actuator block respectively. The sliding member is formed with a slot, and the sliding probe is formed with a slider hanging from and slidable along the slot of the sliding member.

In another embodiment, the actuator block is formed with two grooves along two opposite sides thereof, and the sliding member is formed with two sliders hanging from and slidable along the two grooves of the actuator block respectively. The sliding member is formed with a slot, and the sliding probe is formed with a slider hanging from and slidable along the slot of the sliding member.

BRIEF DESCRIPTION OF THE DRAWINGS

Specific embodiments of the user-configurable waterproof camera case disclosed in the present patent application will now be described by way of example with reference to the accompanying drawings wherein.

DETAILED DESCRIPTION

Figure 1:
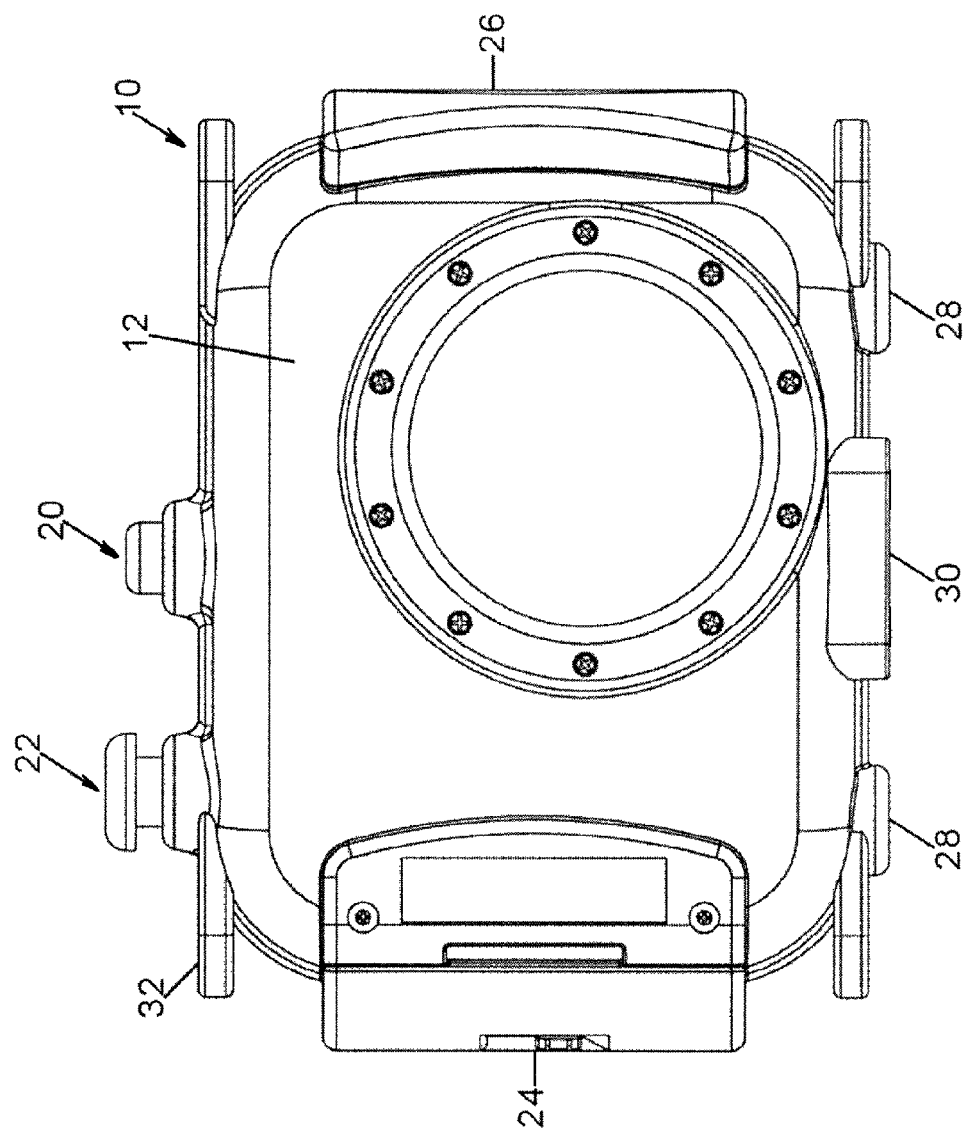
FIG. 1 is a front view of a user-configurable waterproof camera case according to an embodiment disclosed in the present patent application.

Reference will now be made in detail to embodiments of the user-configurable waterproof camera case disclosed in the present patent application, examples of which are also provided in the following description. Exemplary embodiments of the user-configurable waterproof camera case disclosed in the present patent application are described in detail, although it will be apparent to those skilled in the relevant art that some features that are not particularly important to an understanding of the user-configurable waterproof camera case may not be shown for the sake of clarity.

Certain terminology is used in the following description for convenience only and is not limiting. The word "left", "right", "upper", "lower", "top" or "bottom" designate directions in the drawings to which reference is made. The terminology includes the words noted above as well as derivatives thereof and words of similar import. In addition, as used herein, the term "button" refers to a shutter button or an on/off button of a camera.

Figure 2:
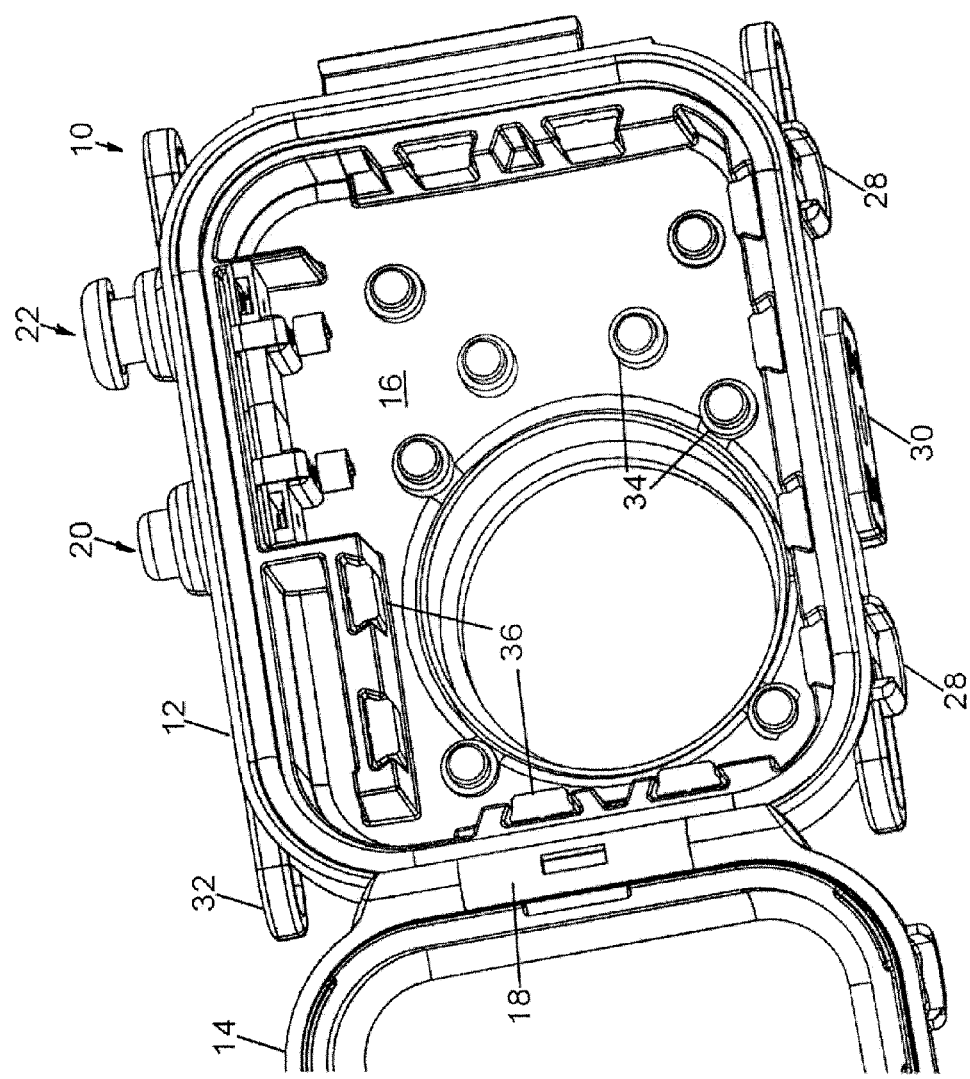
FIG. 2 is a fragmentary perspective view of an opened waterproof camera case showing the interior of the front housing.
Figure 3:
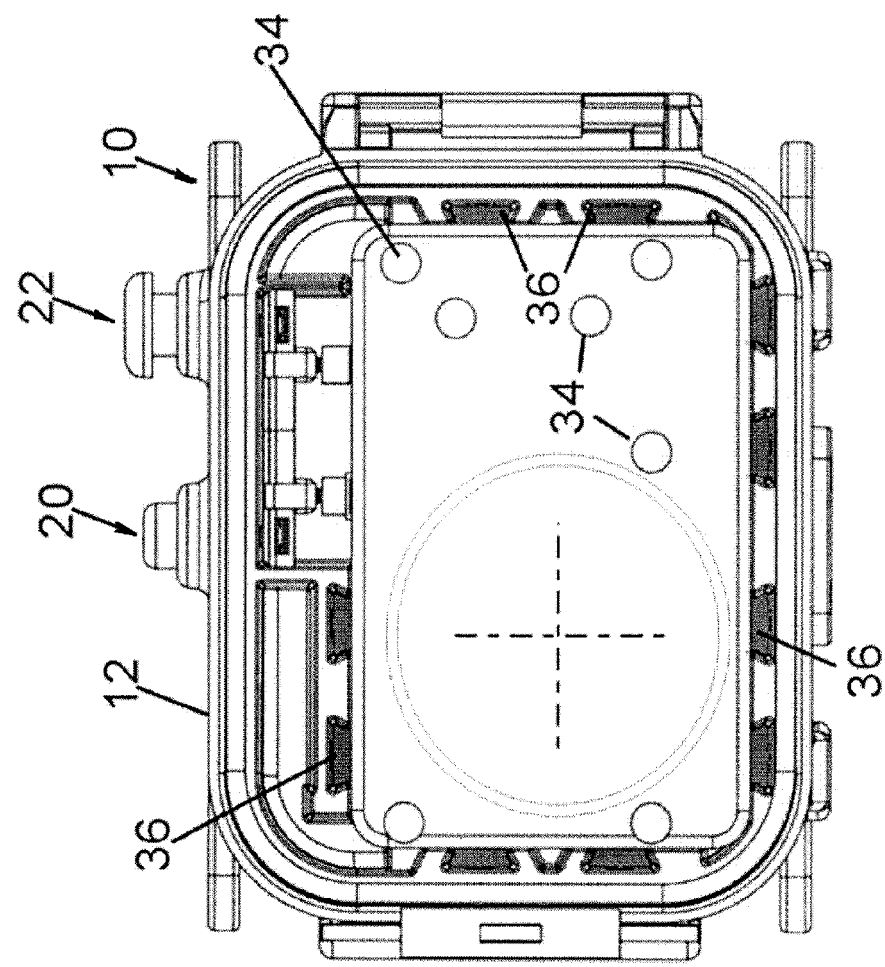
FIG. 3 is a rear view of the front housing of the waterproof camera case.

Referring to the drawings in which like reference numerals represent like parts throughout the drawings, FIG. 1 is a front view of a user-configurable waterproof camera case 10 and FIGS. 2-3 show the interior structure of the waterproof camera case 10 according to an embodiment disclosed in the present patent application. The waterproof camera case 10 is a user configurable hard protective case suitable for most compact type cameras, especially for digital cameras. The configuration can be changed in order to match different cameras of different sizes and with different locations of shutter button, on/off button and lens of different sizes and locations.

The camera case 10 can be used to protect the camera from water damaging the electronic, mechanical and optical parts inside the camera. It can also protect the camera against dust, sand and dirt. It can submerge into water at a depth of up to 40 meters. It is suitable for most water sports and activities e.g. swimming, surfing, wind surfing, water skating, yachting, snorkeling, water diving or under rain/snow photo taking.

The camera case 10 may include a front housing 12, a rear housing 14, a cavity 16, a hinge 18, an on/off actuator assembly/mechanism 20, a shutter actuator assembly/mechanism 22, a right handle 24, a left handle 26, feet 28, and a heel plate 30. The front and rear housing 12, 14 may be made of plastic or other suitable materials. The interior of the camera case 10 is large enough to accommodate different cameras of different sizes (width, height and thickness).

Figure 4:
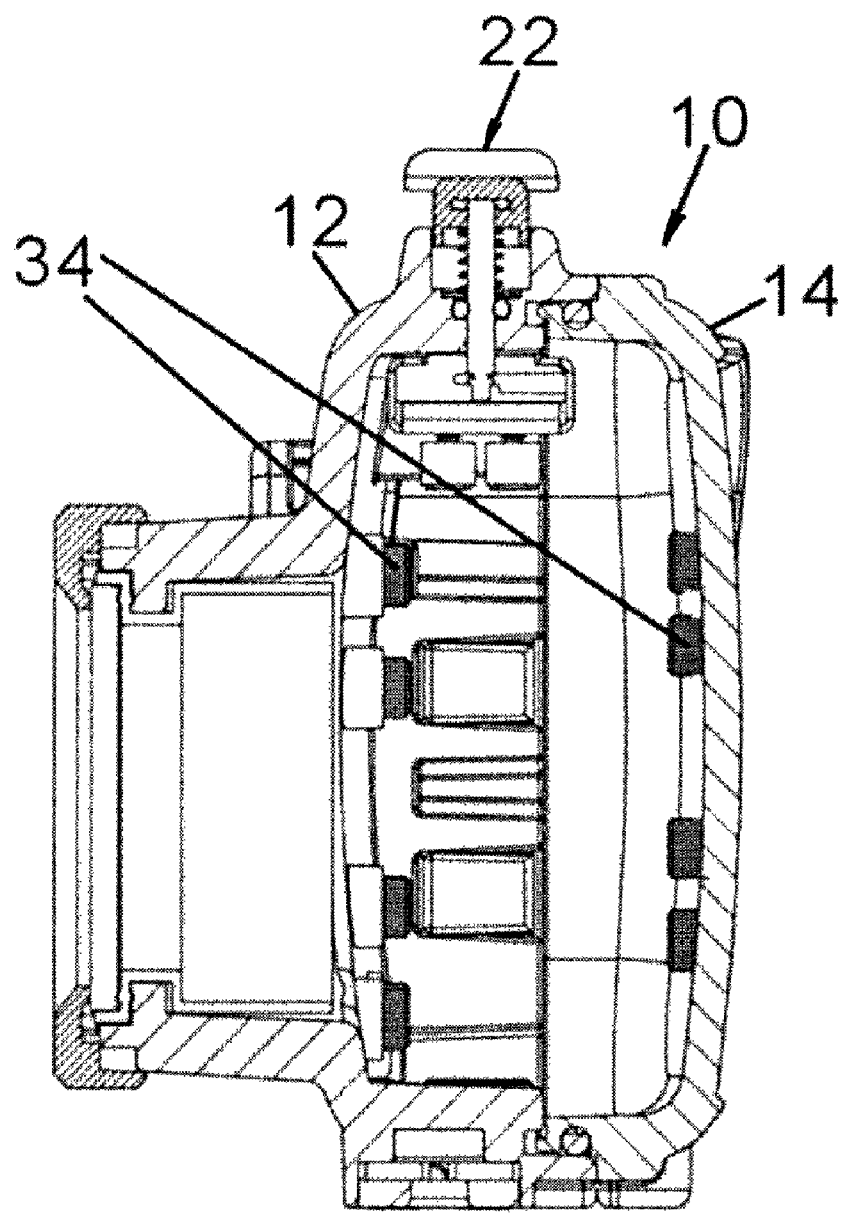
FIG. 4 is a cross sectional view of the waterproof camera case.

There are two major types of digital camera, namely round zoom lens type and flat lens type. Therefore, at least two types of waterproof camera case 10 may be designed in order to accommodate the two different types of camera. A configurable waterproof compact digital camera case 10 for round zoom lens type is illustrated in FIG. 4. The lens cavity at the front housing 12 allows the zoom lens of respective camera type protruding out from the camera body. Waterproof compact digital camera case for flat lens type is similar to that for flat lens type, except that the lens window design is different.

The front housing 12 can be considered as the main body of the configurable waterproof camera case 10. Most of the other components of the camera case 10 are contained in it or affixed to it, as shown in FIG. 2. The rear housing 14 has to match with the front housing 12. It is normally transparent or with a transparent window. It can serve as a "cover" for the front housing 12 allowing the user to load the camera in the camera case 10. The transparent rear housing 14 allows the user to view the object to be photo taken on the camera display on the digital cameras inside the camera case 10. One end of the rear housing 14 may be attached with the hinge 18 connecting to the front housing 12, while the other end of the rear housing 14 may be attached with a lock mechanism. A conventional O-ring gasket may be placed between the front and rear housing 12, 14 in order to seal the camera case 10.

Figure 5:
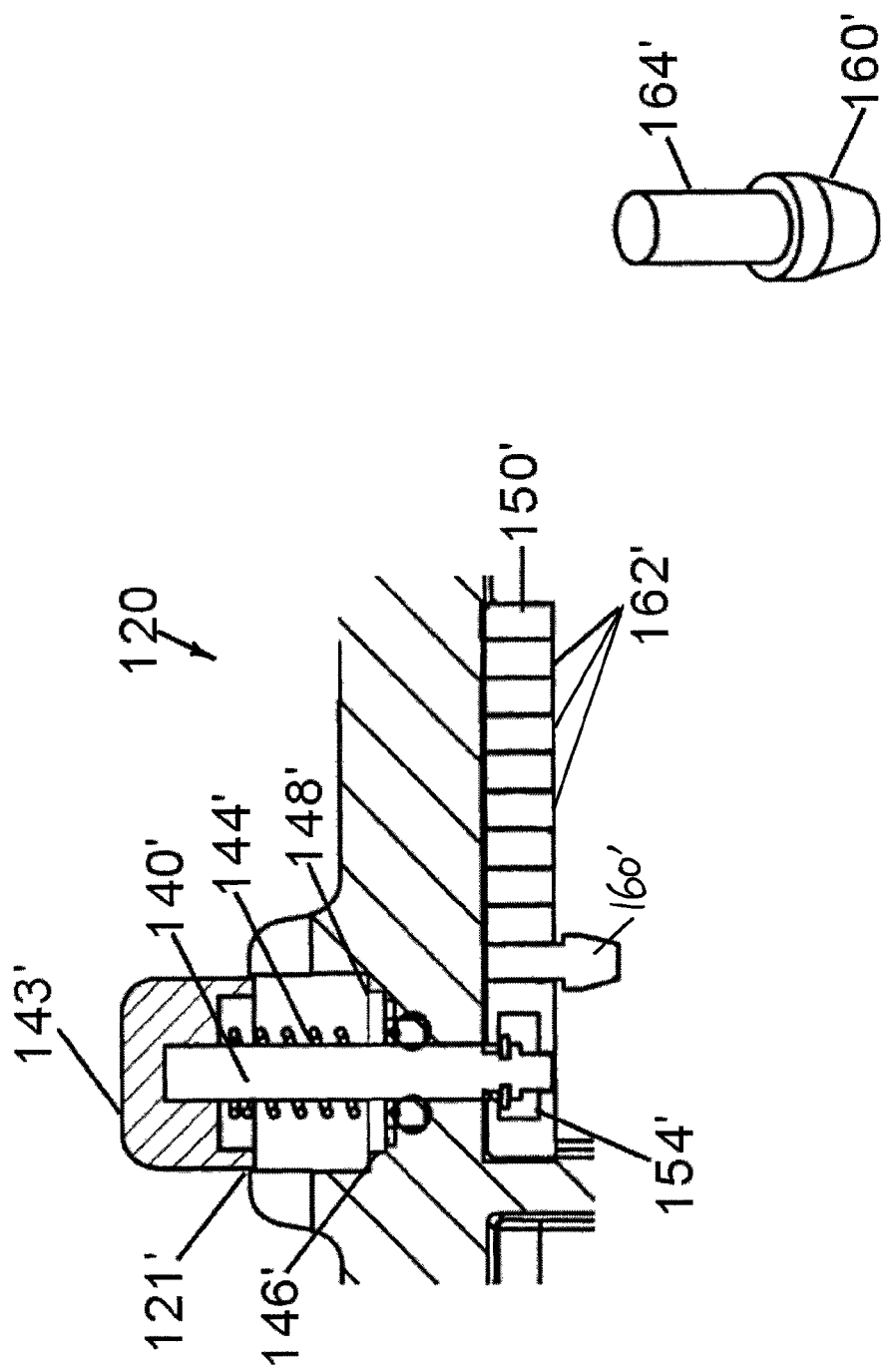
FIG. 5 is a perspective view of a shutter actuator assembly.
Figure 6:
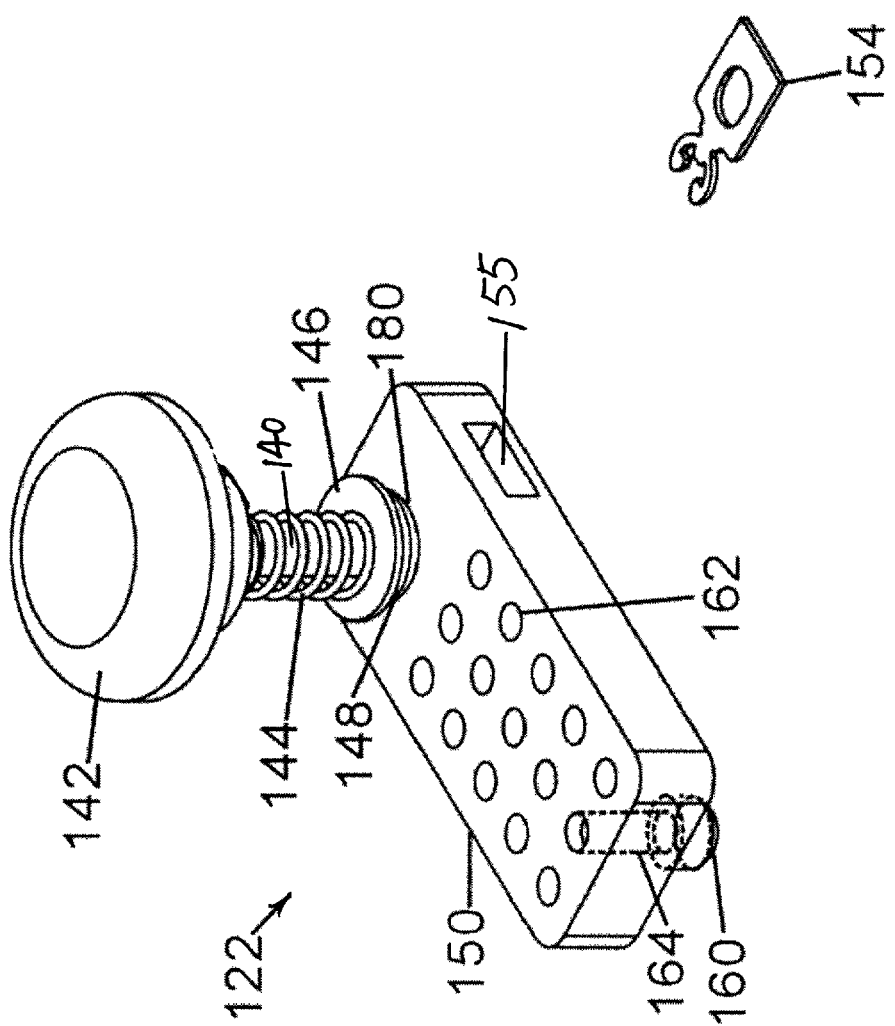
FIG. 6 is a cross sectional view of an on/off actuator assembly.
Figure 7:
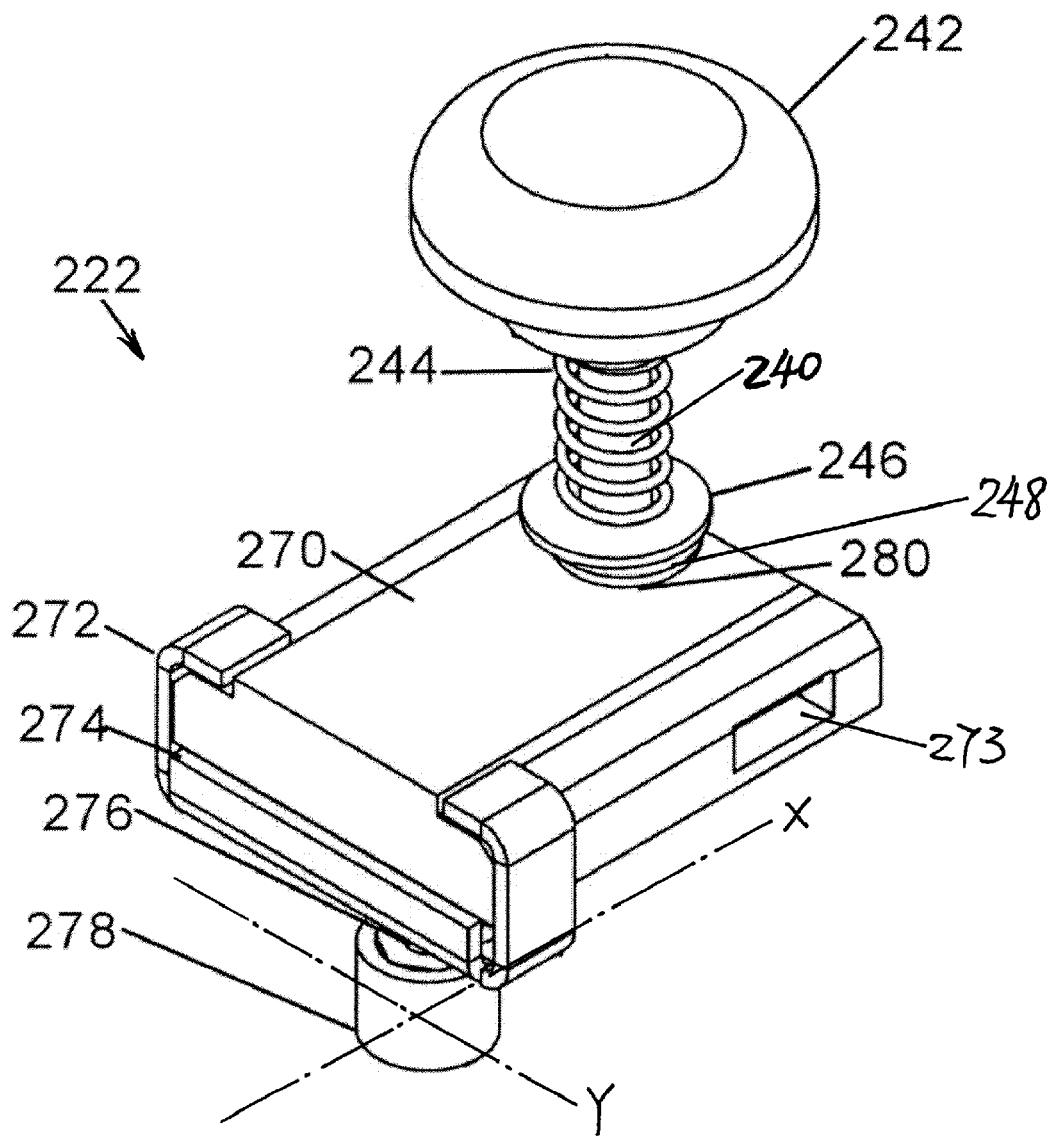
FIG. 7 is a perspective view of another embodiment of the shutter actuator assembly.
Figure 8:
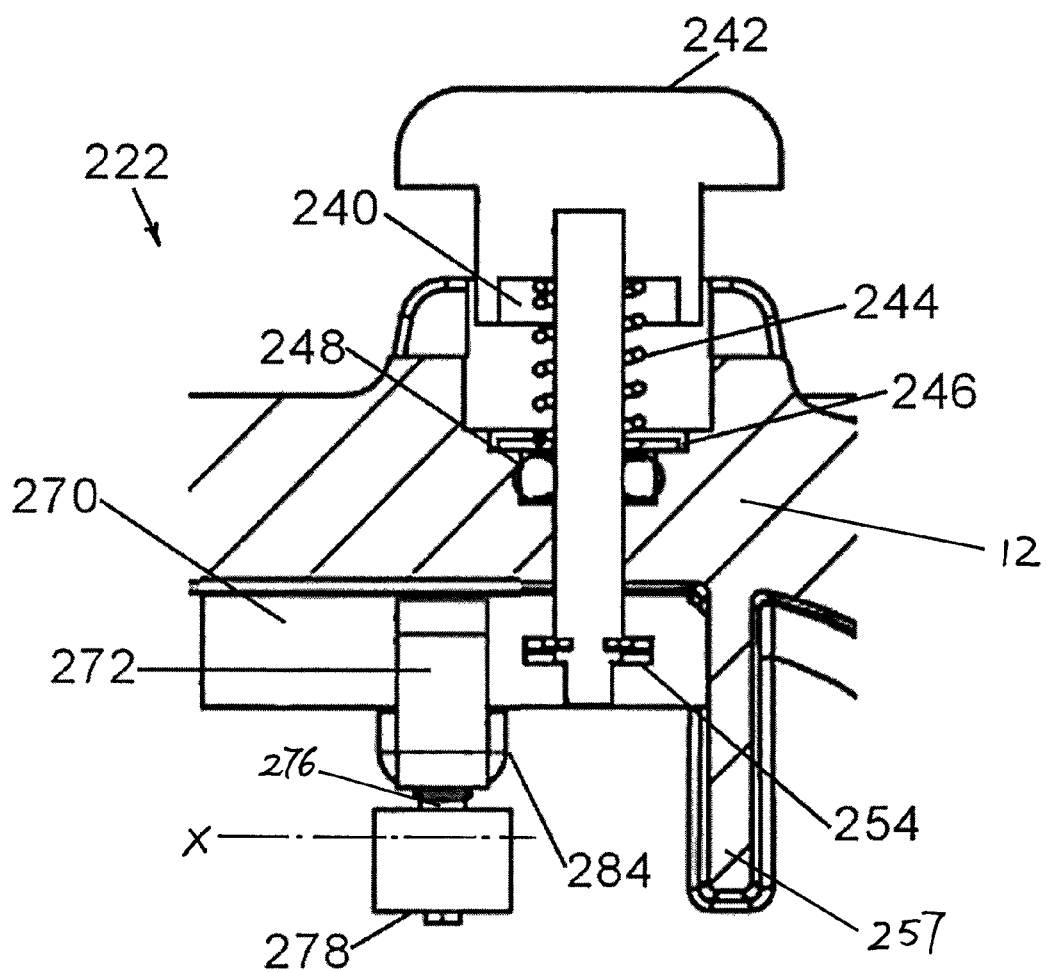
FIG. 8 is a longitudinal cross sectional view of the shutter actuator assembly in FIG. 7.
Figure 9:
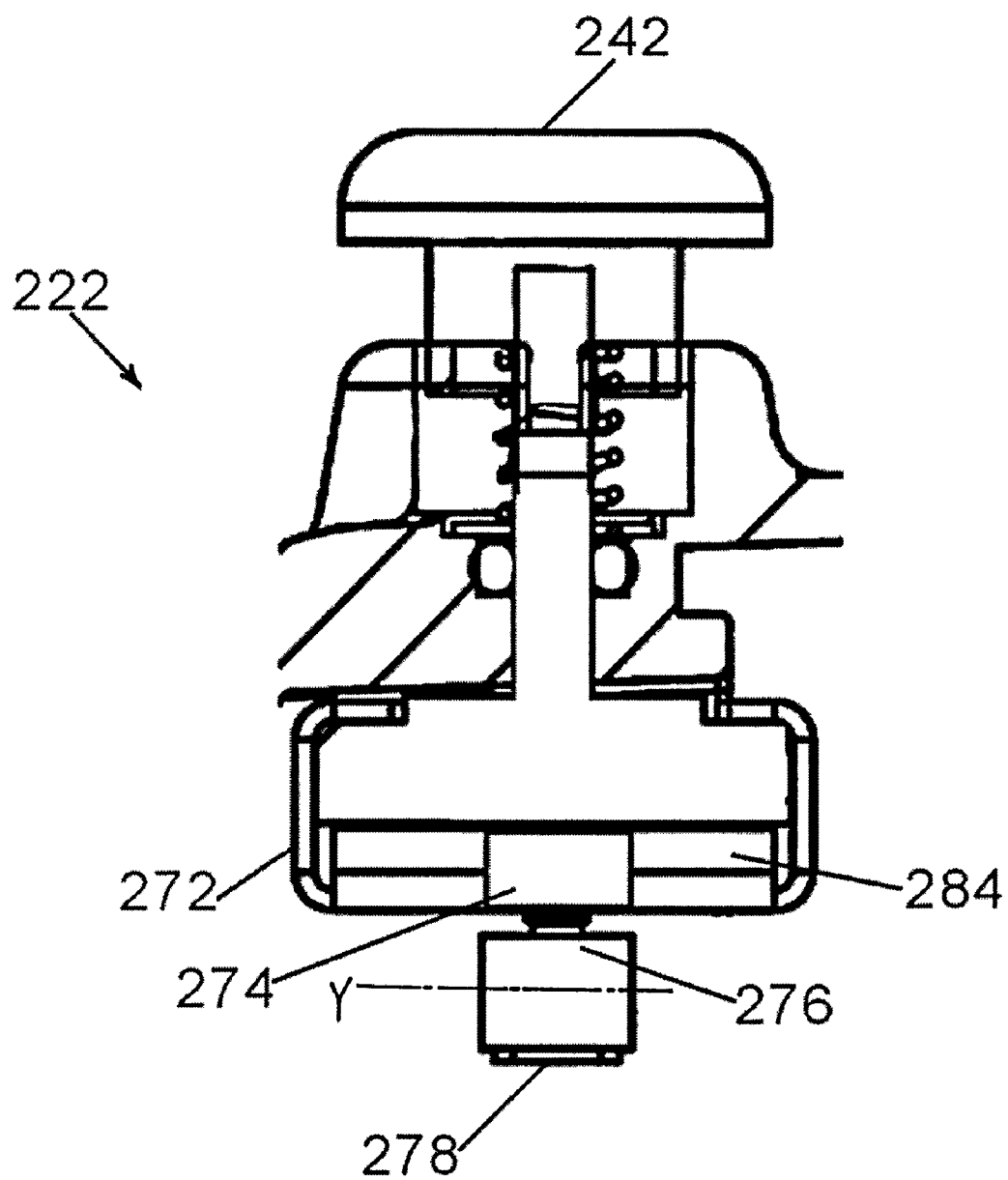
FIG. 9 is a transverse cross sectional view of the shutter actuator assembly in FIG. 7.
Figure 10:
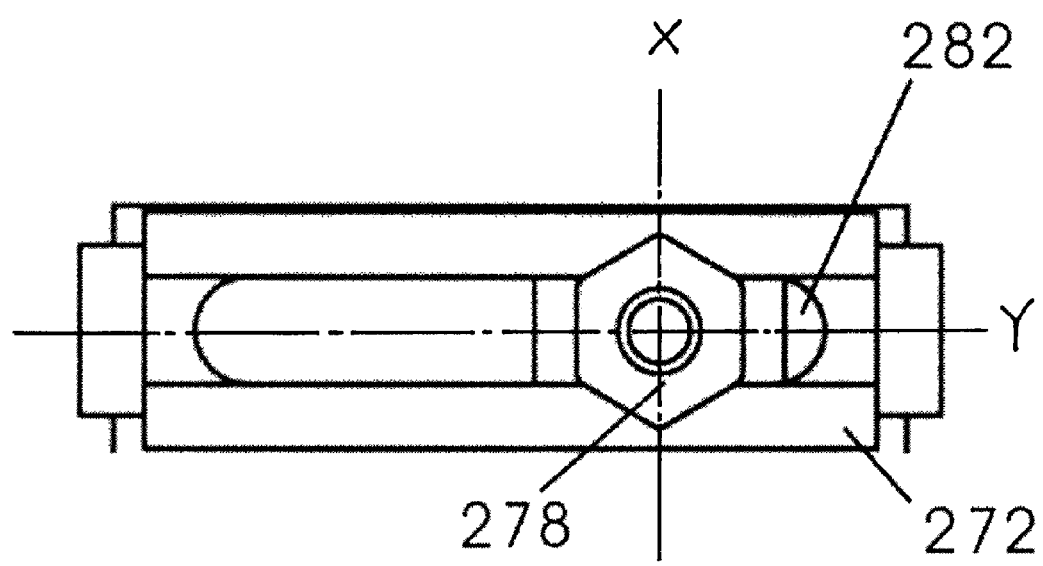
FIG. 10 is a bottom view of the C-clamp showing the slot and the probe of the shutter actuator assembly in FIG. 7.
Figure 11:
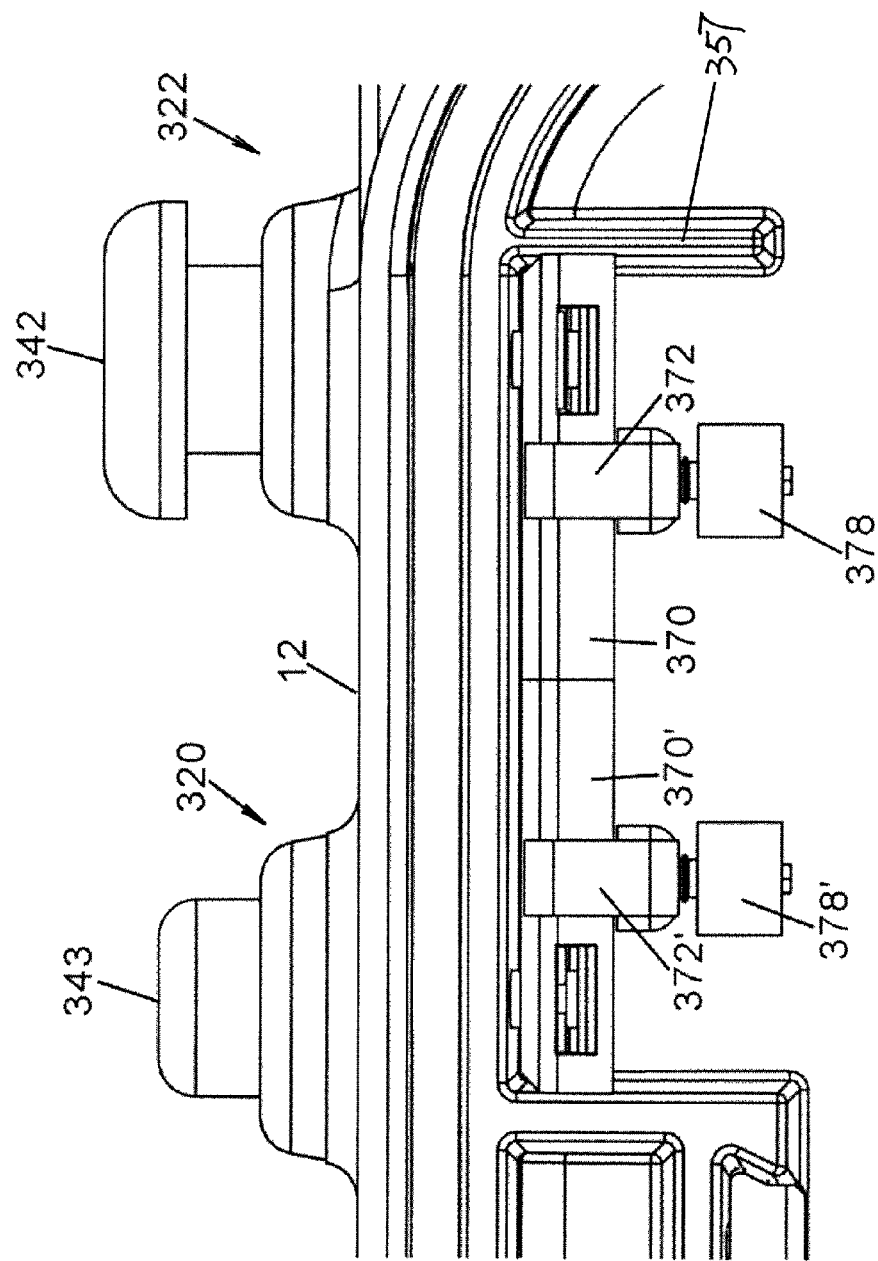
FIG. 11 is a rear view of the shutter and on/off actuator assemblies according to a further embodiment disclosed in the present patent application.

FIGS. 5-6 show a first embodiment of the on/off actuator mechanism 120 and the shutter actuator mechanism 122 respectively.

Referring to FIG. 6, the shutter actuator mechanism or assembly 122 can be provided at the front housing 12 of the camera case 10. This is to allow the user to control the shutter of the camera from outside of the camera case 10 through a spring-loaded actuator shaft 140.

The actuator shaft 140 extends through an opening provided on the camera case 10. An inner end of the actuator shaft 140 is located inside the camera case 10 and an outer end of the actuator shaft 140 is located outside the camera case 10. The actuator shaft 140 may be provided with a shutter knob or button 142 at the outer end of the actuator shaft 140. The shutter knob 142 can be made of plastic or metal materials. The actuator shaft 140 may be installed with a spring 144, a washer 146 and a little o-ring gasket 148 in the front housing 12. The purpose of the spring 144 is to give a "bounce back" force to the shutter actuator mechanism 122, so the shutter actuator mechanism 122 can move back to its original position when the shutter knob 142 is released. The purpose of the washer 146 is to hold the o-ring gasket 148 preventing it from moving up. The o-ring gasket 148 may be circular in cross section. It can be made of elastic material, such as rubber, silicone or plastic. The purpose of the o-ring gasket 148 is to seal and prevent water from flowing into the camera case 10 while the shutter actuator mechanism 122 is being pushed and released. The o-ring gasket 148 may have a smaller inner diameter than the diameter of the actuator shaft 140 when the o-ring gasket 48 is fitted at a shutter o-ring cavity. When the actuator shaft 140 is inserted into the ring, the o-ring gasket 148 can be deformed and pushed against both the actuator shaft 140 and the shutter o-ring cavity at the front housing 12.

Therefore, it can perform water sealing function. The gasket 148 may be lubricated with sealing compound for better sealing performance.

The shutter actuator mechanism 122 may include a probe-carrying member. In the illustrated embodiment, the probe-carrying member is an actuator block 150. The actuator block 150 can be a rectangular block or in other shape with multiple holes on it. The actuator block 150 can be made of plastic or metal. The actuator block 150 may have one hole 180 on one side with a larger diameter on the top and a small diameter further down, with which the actuator block 150 can be installed with the actuator shaft 140 by pinching it into this hole 180. The actuator shaft 140 may have one step smaller diameter near the end of the actuator shaft 140, so that the actuator shaft 140 can stop there. The actuator shaft 140 can then be locked to the actuator block 150 by installing a locking member 154 through an opening 155 to a corresponding groove on the actuator shaft 140. In the illustrated embodiment, the locking member is an E-ring. While the shutter knob 142 is pushed, the actuator block 150 moves downwards. The front housing 12 may be provided with a wall at one end of the actuator block 150 for preventing the actuator block 150 from rotating regardless of its vertical position.

The actuator block 150 can be provided with a plurality of probes 160 of different lengths and shapes (round, oval, etc.) at different holes 162 on the actuator block 150 in order to match different cameras of different models. Each probe 160 may be provided with a probe shaft 164 at the end and can be press fitted in the holes 162 on the actuator block 150. Either the manufacturers or users can make changes on these probes by themselves.

Referring to FIG. 5, an on/off actuator mechanism or assembly 120 is also provided at the top of the camera case 10 allowing the user to switch the camera on or off. The mechanism of the on/off actuator assembly 120 can be the same as the shutter actuator mechanism 122 described above. The on/off actuator mechanism 120 can also be provided with probes 160' of different lengths and shapes at different holes 162' on the actuator block 150' in order to match different camera models similar to the shutter actuator mechanism 122. Either the manufacturers or users can make changes on these probes by themselves.

Although it has been shown that the actuator block 150 or 150' is in the form a generally square block, it is understood that the actuator block 150 or 150' can be a probe-carrying member in any possible form so long as it can carry the probe 160 or 160'.

FIGS. 7-10 show another embodiment of the shutter actuator mechanism. A corresponding on/off actuator mechanism has a similar structure. The shutter actuator mechanism 222 may include actuator shaft 240, shutter knob 242, spring 244, washer 246, o-ring gasket 248, probe-carrying member 270, slide 272, locking block 274, probe shaft 276 and probe pad 278. In the illustrated embodiment, the probe-carrying member 270 is an actuator block, and the slide 272 is a C-clamp.

The actuator block 270 may be in the form of a rectangular block or in other shapes with tracks on both sides. The actuator block 270 can be made of plastic or metal. The actuator block 270 has one hole 280 on one side with a larger diameter on the top and a small diameter further down, with which the actuator block 270 can be installed with the actuator shaft 240 by pinching it into this hole 280. The actuator shaft 240 may have one step smaller diameter near the end of the actuator shaft 240, so that the actuator shaft 240 can stop there. The actuator shaft 240 can then be locked to the actuator block 270 by fixing a locking member or an E-ring 254 through an opening 273 to a lower end of the actuator shaft 240. While the shutter knob 242 is pushed, the actuator block 270 moves downwards. The front housing 12 may be provided with a wall 257 at one end of the actuator block 270 for preventing the actuator block 270 from rotating regardless of its vertical position.

The C-clamp 272 may be installed in a way that it hangs from the two tracks of the actuator block 270. The C-clamp 272 can be made of stiff materials, such as metal. It can move freely in an X direction along the actuator block 270 when the C-clamp 272 is not locked. The C-clamp 272 can move in the X direction or along an X axis on a plane generally perpendicular to an axis of the actuator shaft 240.

A nut or locking block 274 may be placed in between the actuator block 270 and the C-clamp 272. There is a screw hole at the locking block 274 which allows the probe shaft 276 to screw in from the bottom through a slot 282 of the C-clamp 272. The probe shaft 276 can be made of metal or other suitable materials. It is machined with screw thread on the upper portion and a hexagonal bolt or other shaped bolt in the middle. The probe shaft 276 can move in a Y direction freely along the slot 282 of the C-clamp 272 when it is not locked. The Y direction is generally perpendicular to the X direction. A web 284 of the C-clamp 272 can hold the locking block 274 from turning. The web 284 can also strengthen the C-clamp 272 and prevent it from being bent. When the probe shaft 276 is installed, the probe shaft 276 can be moved freely in the X or Y direction. If the probe shaft 276 screws further in, the locking block 274 will be pulling the C-clamp 272 against the actuator block 270, thus introducing friction force between the actuator block 270, the C-clamp 272, the locking block 274 and the probe shaft 276. The probe shaft 276 will then be locked at a fixed position relative to the actuator block 270. The design allows the probe shaft 276 to be positioned at any location with no increment along the actuator block 270 and the slot 282 of the C-clamp 272. Different camera may need to use probe shafts 276 of different lengths available with the product. The manufacturers or users can make changes of the probe shafts by themselves.

The probe pad 278 may be made of an elastic material with different shapes that may match the shape of the button of the camera. It can be installed at the bottom end of the probe shaft 276 facing the camera for pressing the button of the camera and preventing the shaft 276 from scratching the camera button surface. The probe pad 278 can easily be installed by pushing the probe pad 278 against the probe shaft 276. It can be self-locked by a gap on the probe shaft 276.

FIGS. 11-15 show a combined shutter actuator mechanism 322 and on/off actuator mechanism 320 according to a further embodiment disclosed in the present patent application.

Figure 13:
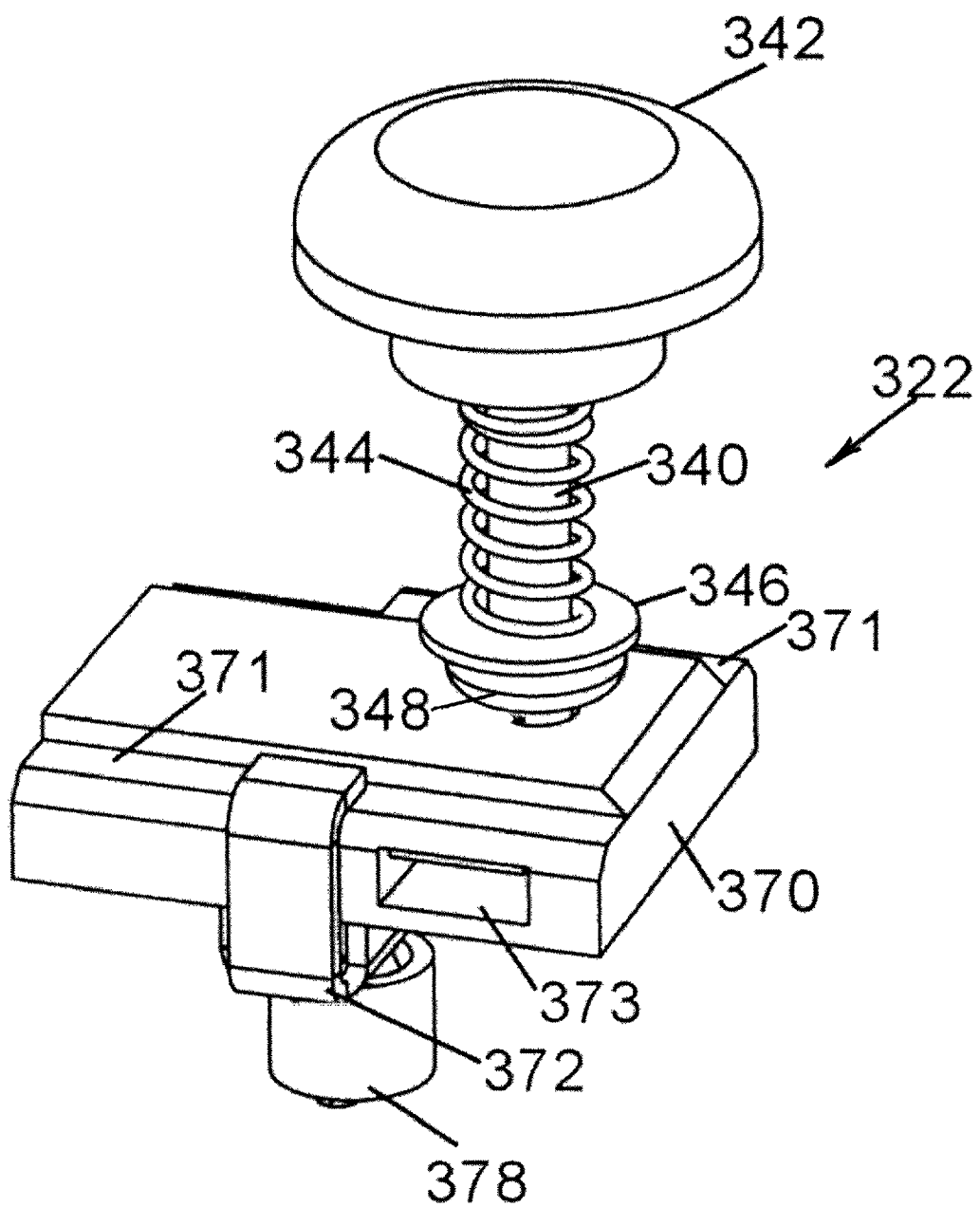
FIG. 13 is a perspective view of the shutter actuator assembly in FIG. 11.
Figure 15:
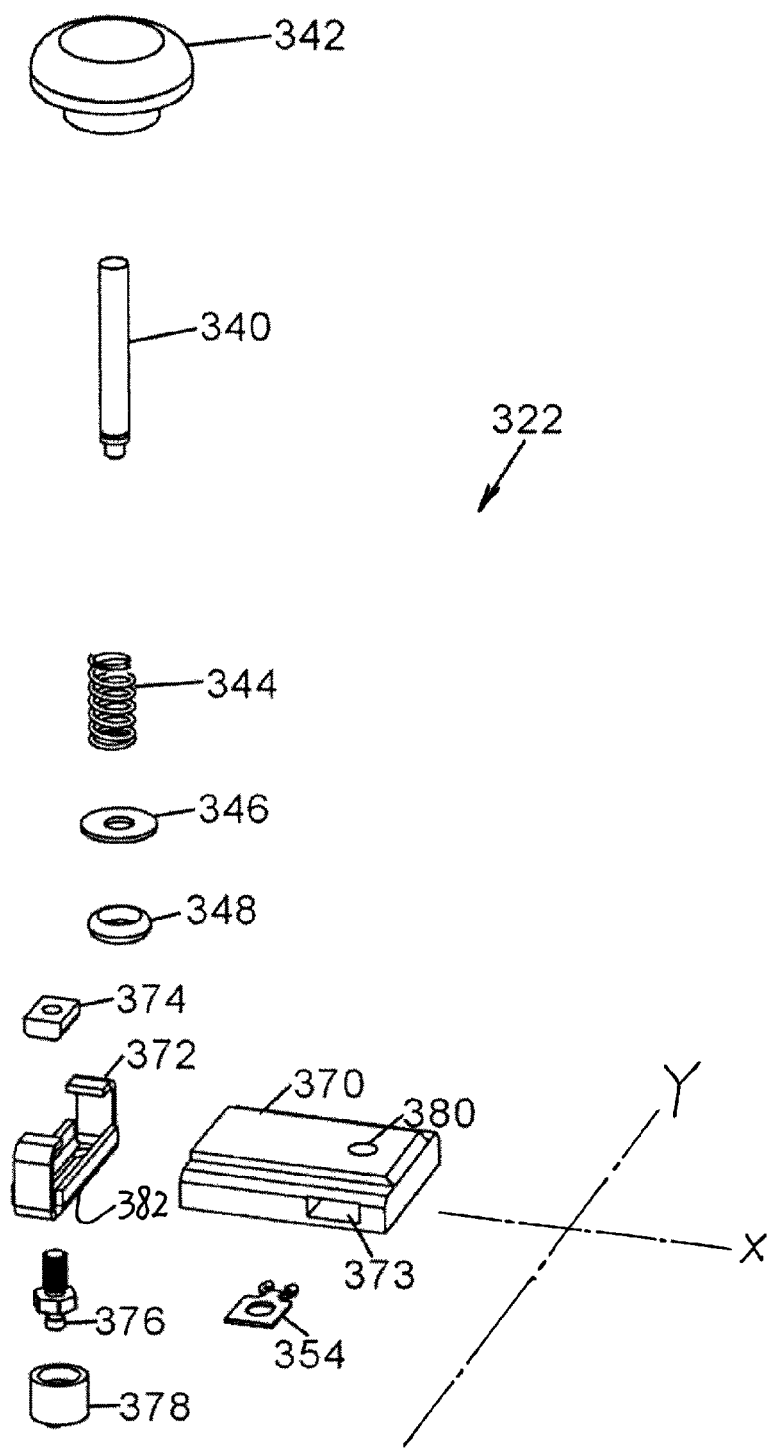
FIG. 15 is an exploded view of the shutter actuator assembly in FIG. 13.

Referring to FIGS. 13 and 15, the shutter actuator mechanism 322 may include actuator shaft 340, shutter knob 342, spring 344, washer 346, o-ring gasket 348, probe-carrying member 370, slide 372, probe shaft 376 and probe pad 378. In the illustrated embodiment, the probe-carrying member 370 is an actuator block, and the slide 372 is a C-clamp.

The actuator block 370 may be in the form of a rectangular block or in other shapes with opposite parallel tracks 371 on both sides. The actuator block 370 can be made of plastic or metal. The actuator block 370 may have one hole 380 on one side with a larger diameter on the top and a small diameter further down, with which the actuator block 370 can be installed with the actuator shaft 340 by pinching it into this hole 380. The actuator shaft 340 may have one step smaller diameter near the end of the actuator shaft 340, so that the actuator shaft 340 can stop there. The actuator shaft 340 can then be locked to the actuator block 370 by inserting a locking member or an E-ring 354 into an opening 373, engaging the E-ring 354 into a corresponding groove on the shaft 340, and locking the actuator shaft 340 in the hole 380. While the shutter knob 342 is pushed, the actuator block 370 moves downwards. The front housing 12 may be provided with a wall 357 (FIGS. 11 and 16-18) at one end of the actuator block 370 for preventing the actuator block 370 from rotating regardless of its vertical position.

The C-clamp 372 may be installed in a way that it hangs from the two opposite parallel tracks 371 of the actuator block 370. The C-clamp 372 can be made of stiff materials, such as metal. It can move freely in the X direction along the actuator block 370 when the C-clamp 372 is not locked.

The probe shaft 376 may be made of metal or other suitable materials. It is machined with screw thread on an upper portion and a hexagonal bolt or other shaped bolt in the middle. The probe shaft 376 can move in the Y direction freely along a slot 382 of the C-clamp 372 when it is not locked. When the probe shaft 376 is installed, the probe shaft 376 can be moved freely in the X or Y direction. If the probe shaft 376 screws further in, it bears against the actuator block 370. The probe shaft 376 can then be locked at a fixed position relative to the actuator block 370. The design allows the probe shaft 376 to be positioned at any location with no increment along the actuator block 370 and the slot 382 of the C-clamp 372. Different cameras may need to use probe shafts 376 of different lengths available with the product. The manufacturers or users can make changes by themselves.

The probe pad 378 is an elastic material with different shapes that may match the shape of the button of the camera. It can be installed at the bottom end of the probe shaft 376 for the pressing the button of the camera and preventing the shaft 376 from scratching the camera button surface. The probe pad 378 can easily be installed by pushing the probe pad 378 against the probe shaft 376. It can be self-locked by a gap on the probe shaft 376.

Although it has been shown that the actuator block 370 is generally in the form a square block, it is understood that the actuator block 370 can be a probe-carrying member in any possible form so long as it can carry the probe shaft 376.

Figure 12:
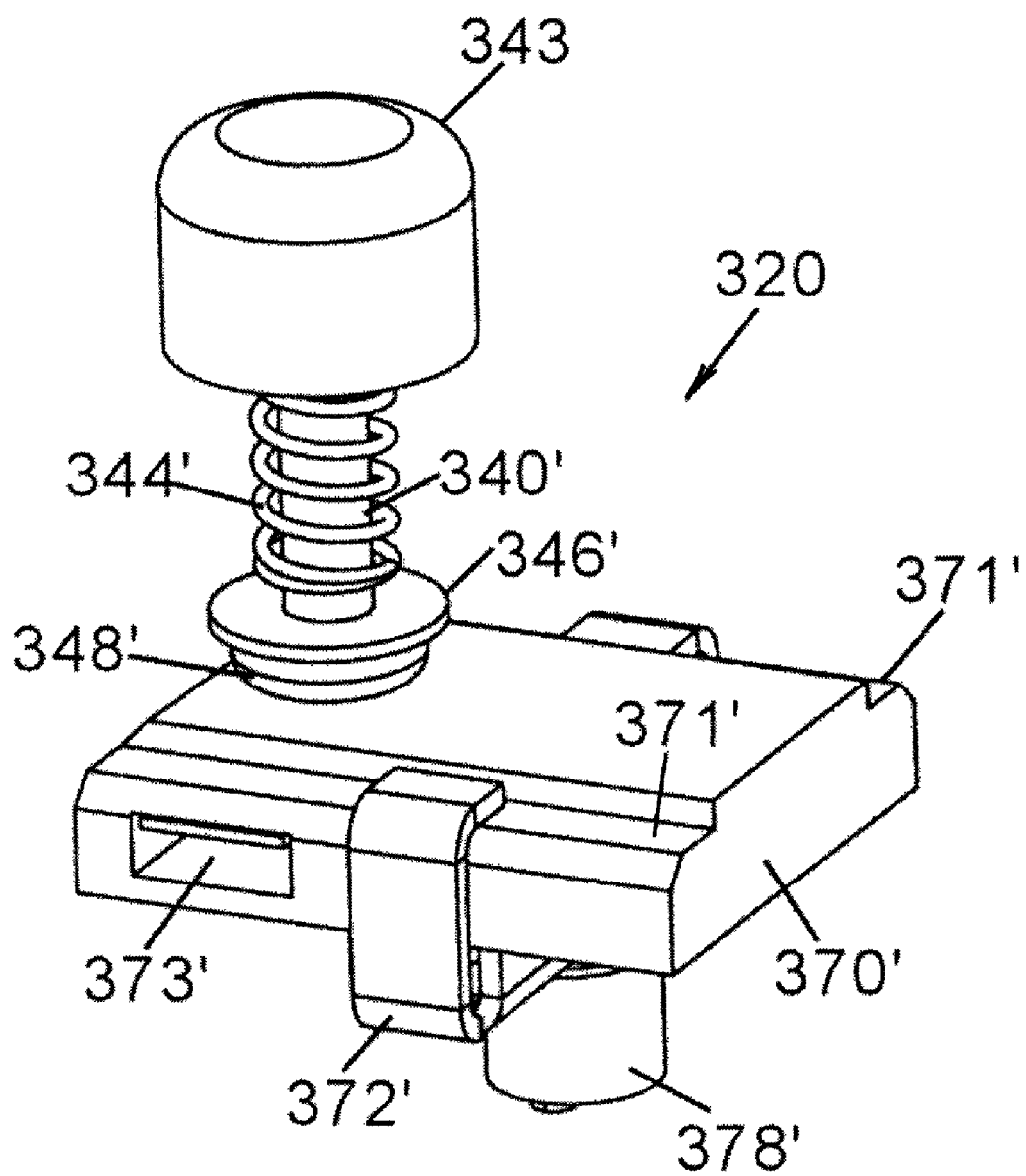
FIG. 12 is a perspective view of the on/off actuator assembly in FIG. 11.
Figure 14:
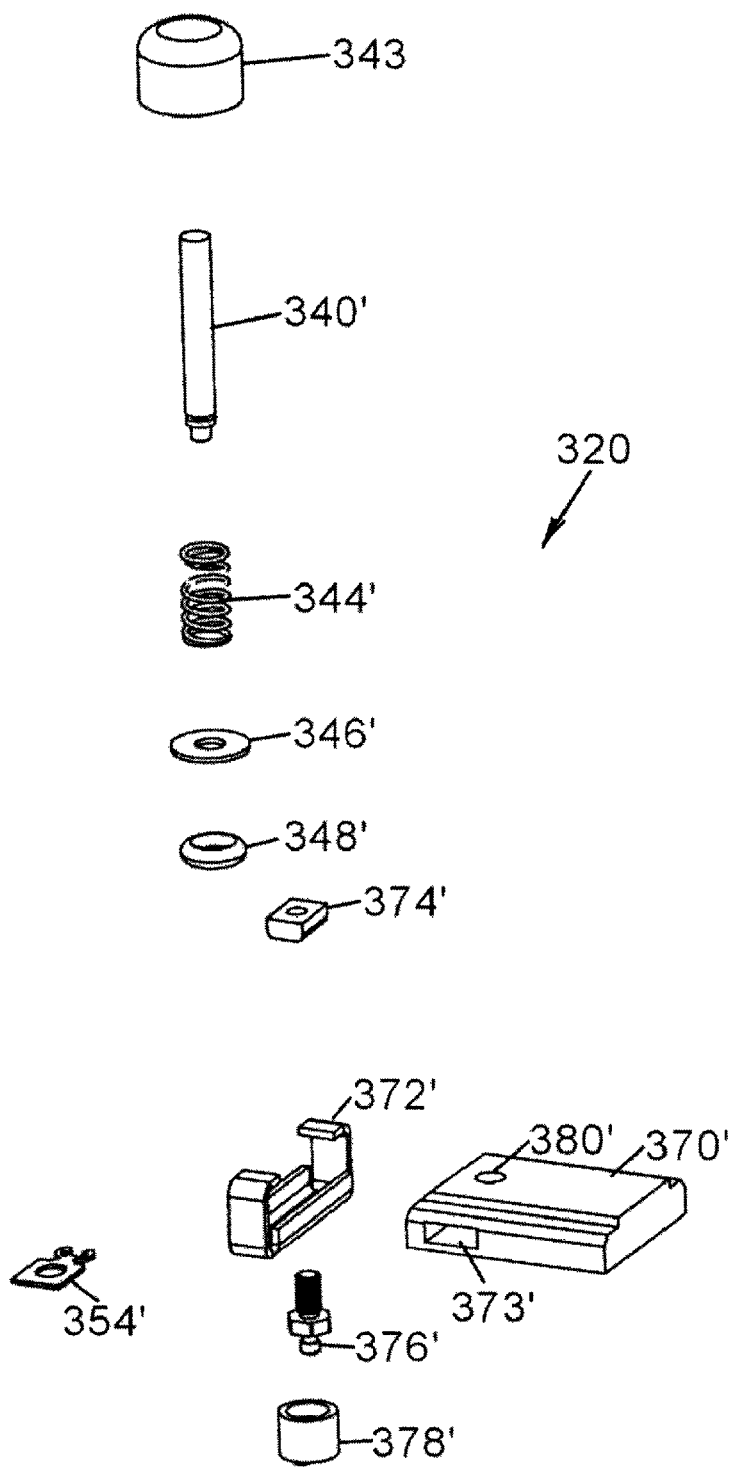
FIG. 14 is an exploded view of the on/off actuator assembly in FIG. 12.

The on/off actuator mechanism 320 in FIGS. 12 and 14 has a similar structure as the shutter actuator mechanism 322 in FIGS. 13 and 15.

Figure 16:
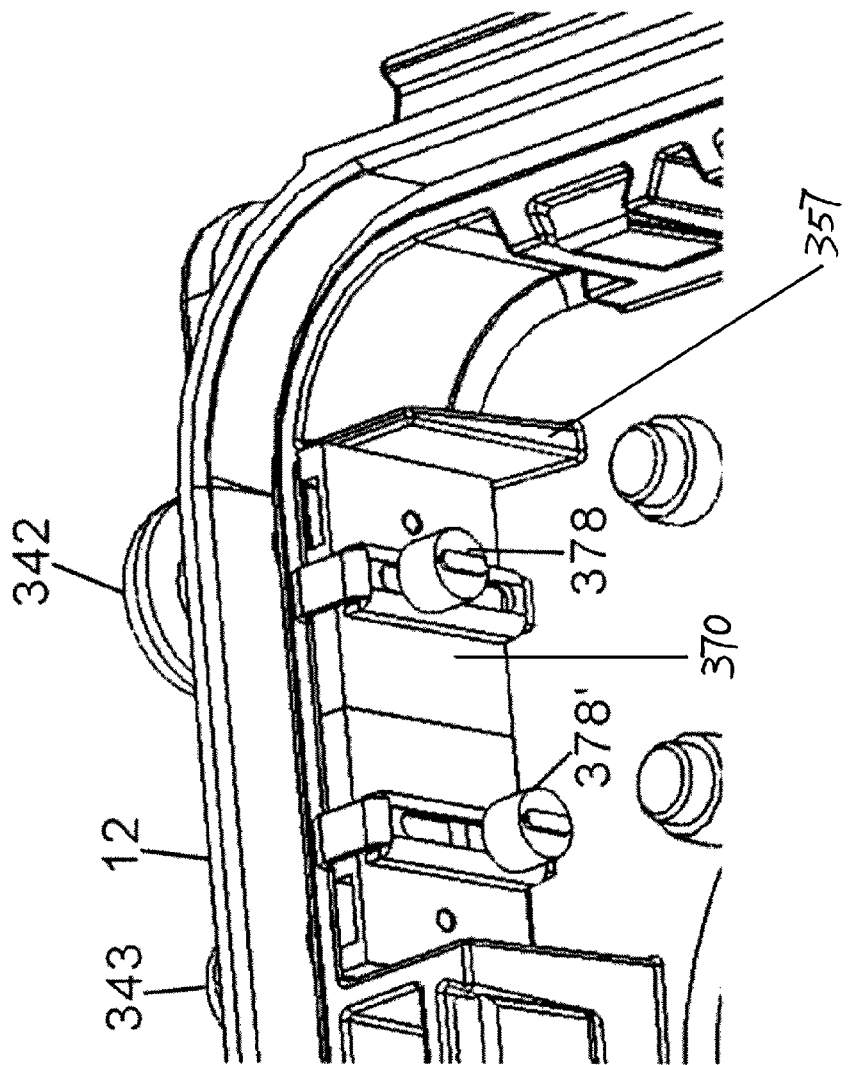
FIGS. 16-18 are fragmentary perspective views showing three different positions of the probes of the shutter and on/off actuator assemblies.
Figure 17:
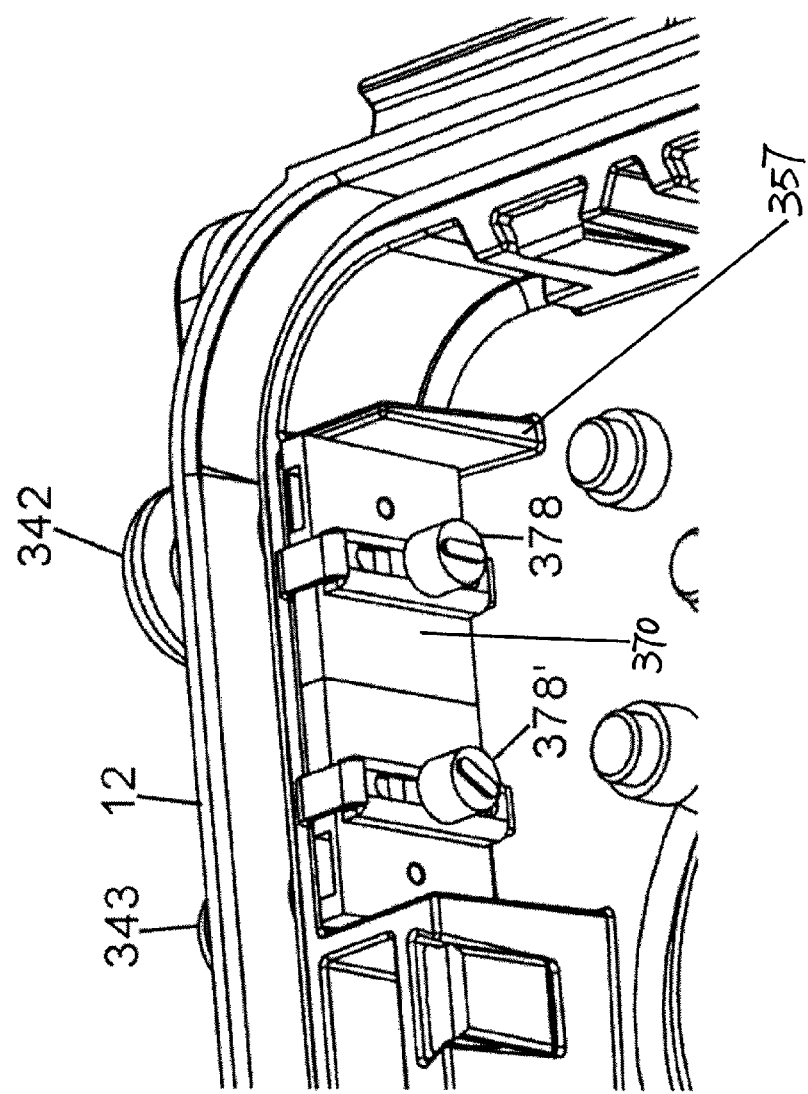
Figure 18:
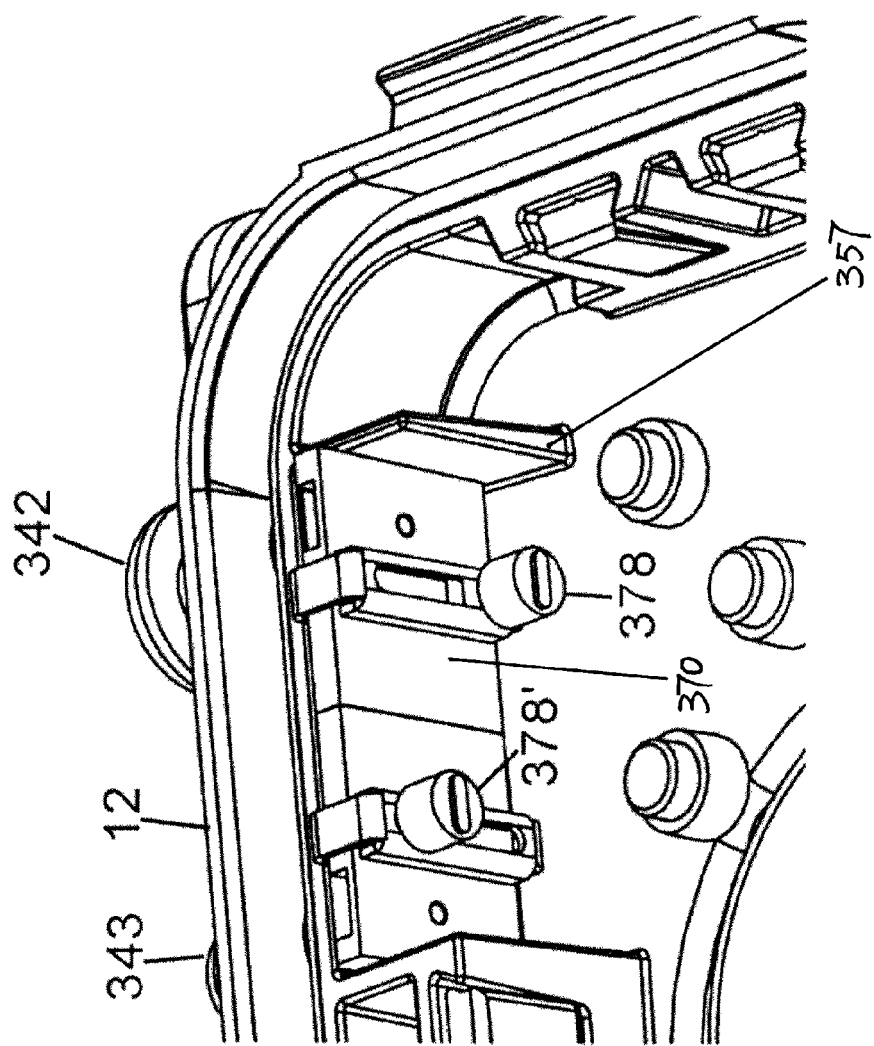

FIGS. 16-18 show three different configurations of the shutter actuator mechanism 322 and on/off actuator mechanism 320 for different cameras with different locations of the shutter and on/off buttons.

Figure 19:
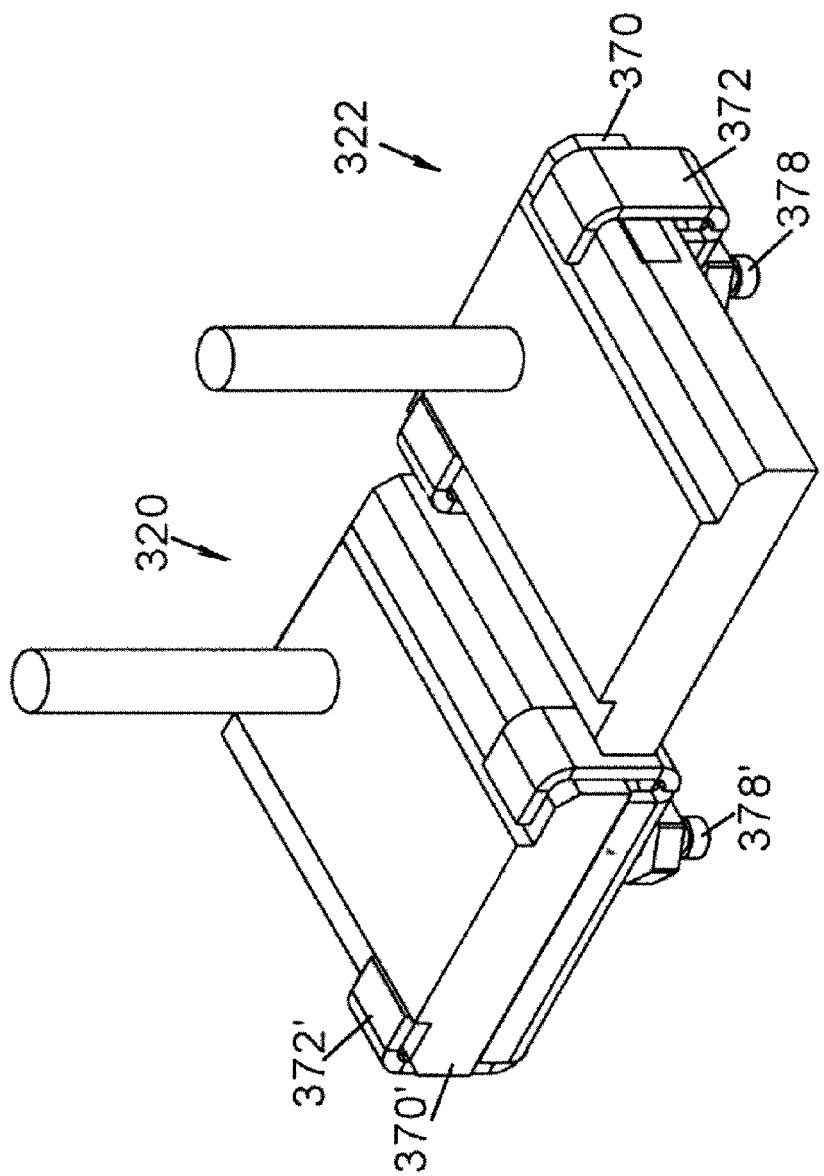
FIG. 19 is a perspective view of the shutter and on/off actuator assemblies.
Figure 20:
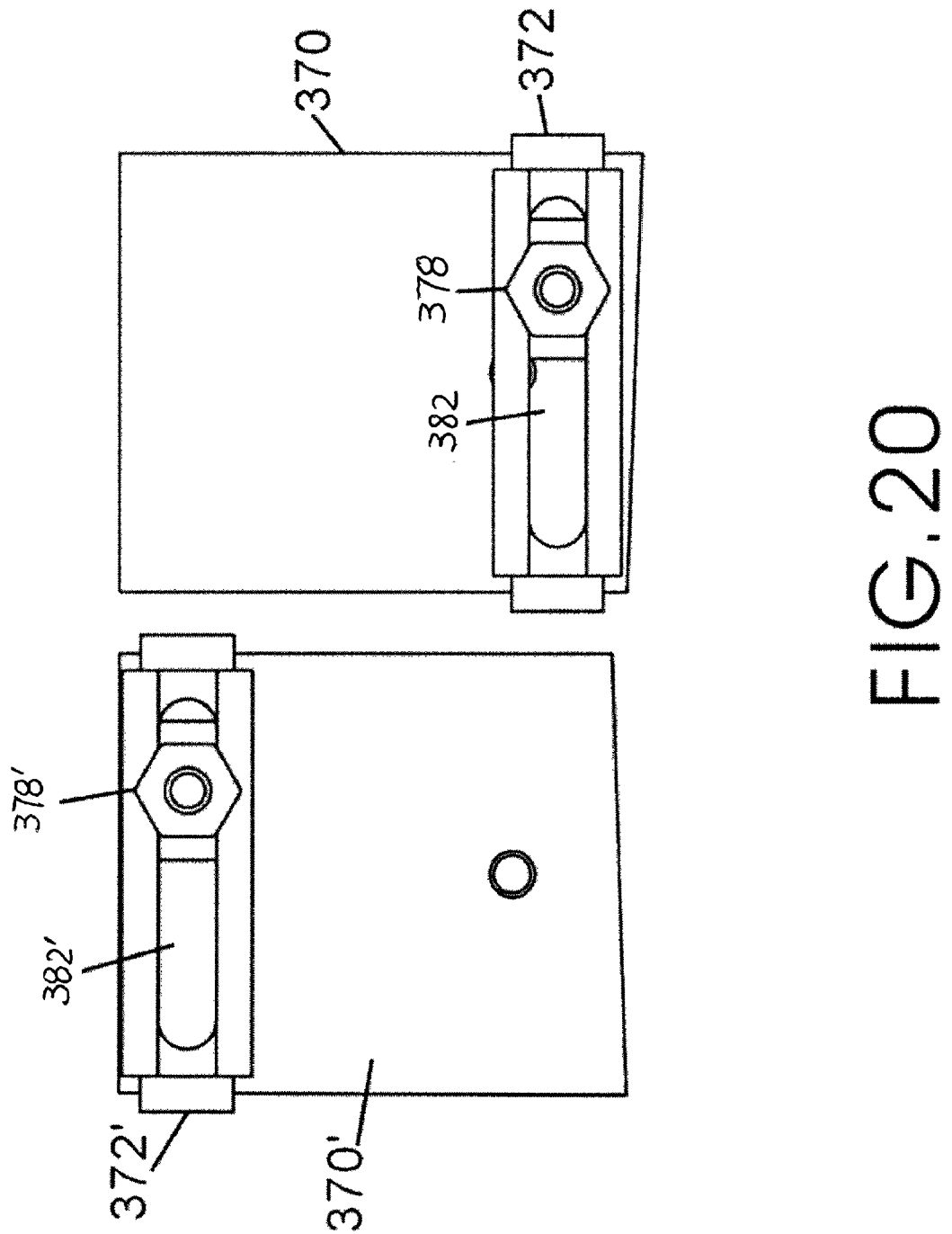
FIG. 20 is a bottom view of the shutter and on/off actuator assemblies in FIG. 19.
Figure 21:
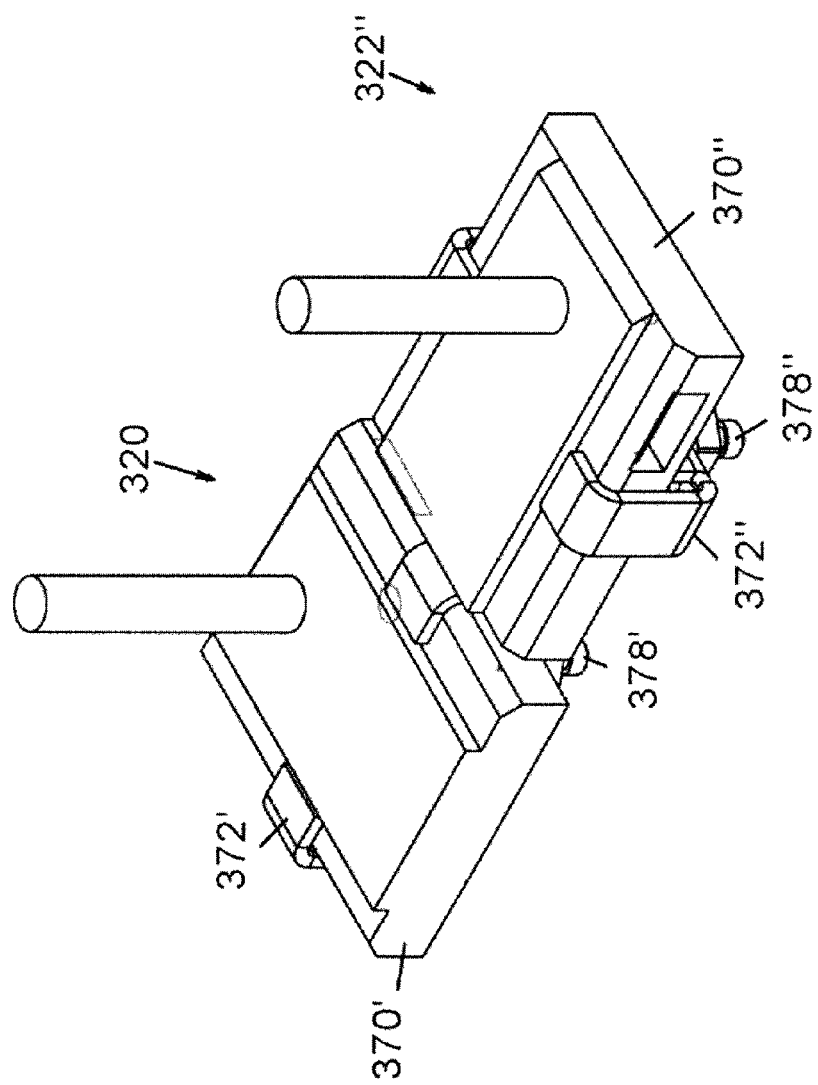
FIG. 21 is a perspective view of another embodiment of the shutter and on/off actuator assemblies.
Figure 22:
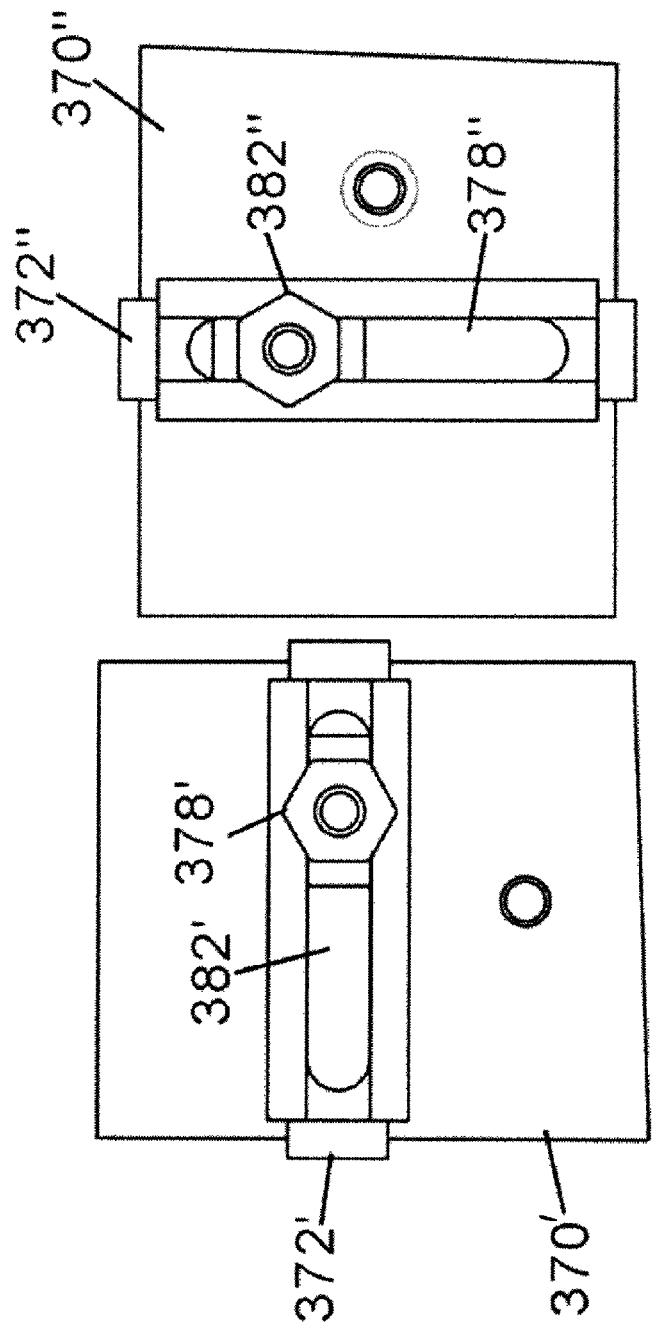
FIG. 22 is a bottom view of the shutter and on/off actuator assemblies in FIG. 21.

FIGS. 19 and 20 show a different embodiment of the shutter actuator mechanism 322 and on/off actuator mechanism 320. In this embodiment, the two actuator blocks 370, 370' and the two C-clamps 372, 372' are both oriented at 90 degrees with respect to the previous embodiment. FIGS. 21 and 22 show a further embodiment of the shutter actuator mechanism 322 and on/off actuator mechanism 320 in which the two actuator blocks 370, 370' and the two C-clamps 372, 372' are oriented at 90 degrees from each other.

In order to allow different sizes of camera to be fitted inside the camera case 10, a plurality of cushions of different shapes and sizes may be provided on the inner surfaces of the front and rear housings 12, 14.

As depicted in FIGS. 3 and 4, the inner surfaces of the front housing 12 may include a few setoffs where front cushions 34 can be attached to these setoffs. The cushions 34 can be round or other shapes and may be made of soft or elastic material, e.g. rubber, silicone, plastic or latex. The cushions 34 can have water resistance self-adhesive materials on the bottom side thereof. The cushions 34 can be installed easily into the setoffs simply by removing the wax paper and attached the cushions 34 to the housing 12 by applying some pressure on them. The cushions can have different thicknesses. The purpose of different thicknesses is to position the camera in an optimum distance from the front housing 12 within the cavity 16 of the camera case 10. In addition, the camera can be positioned such that the shutter button and/or the on/off button fall within the shutter and on/off actuator mechanisms of the waterproof camera case 10.

Figure 23:
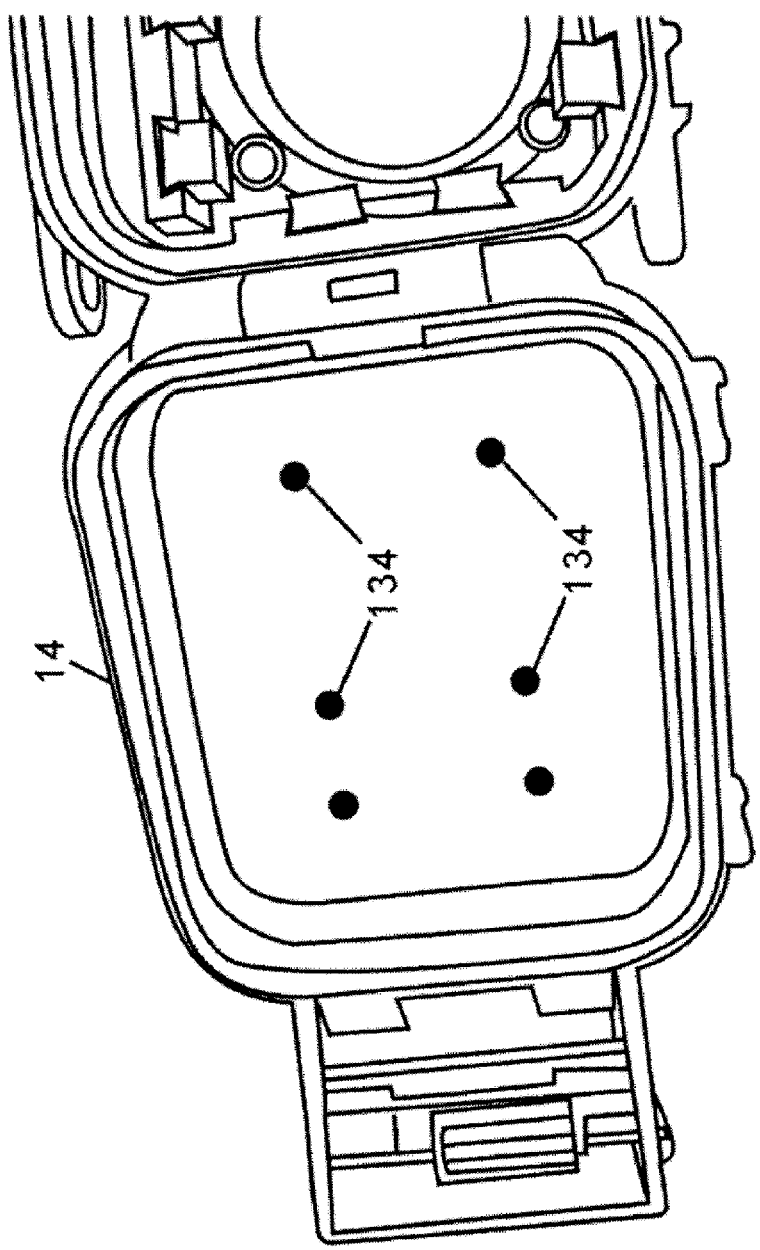
FIG. 23 shows a plurality of back cushions provided at the rear housing.

FIG. 23 shows a plurality of back cushions 134 which are made of soft material, such as sponge, silicone, latex or plastic, and can be attached on the inner surface of the rear housing 14. The cushions 134 can be round, square, or some other shapes. It is use to press the camera in place to the front housing 12 preventing the camera from moving inside the camera case 10.

Figure 24:
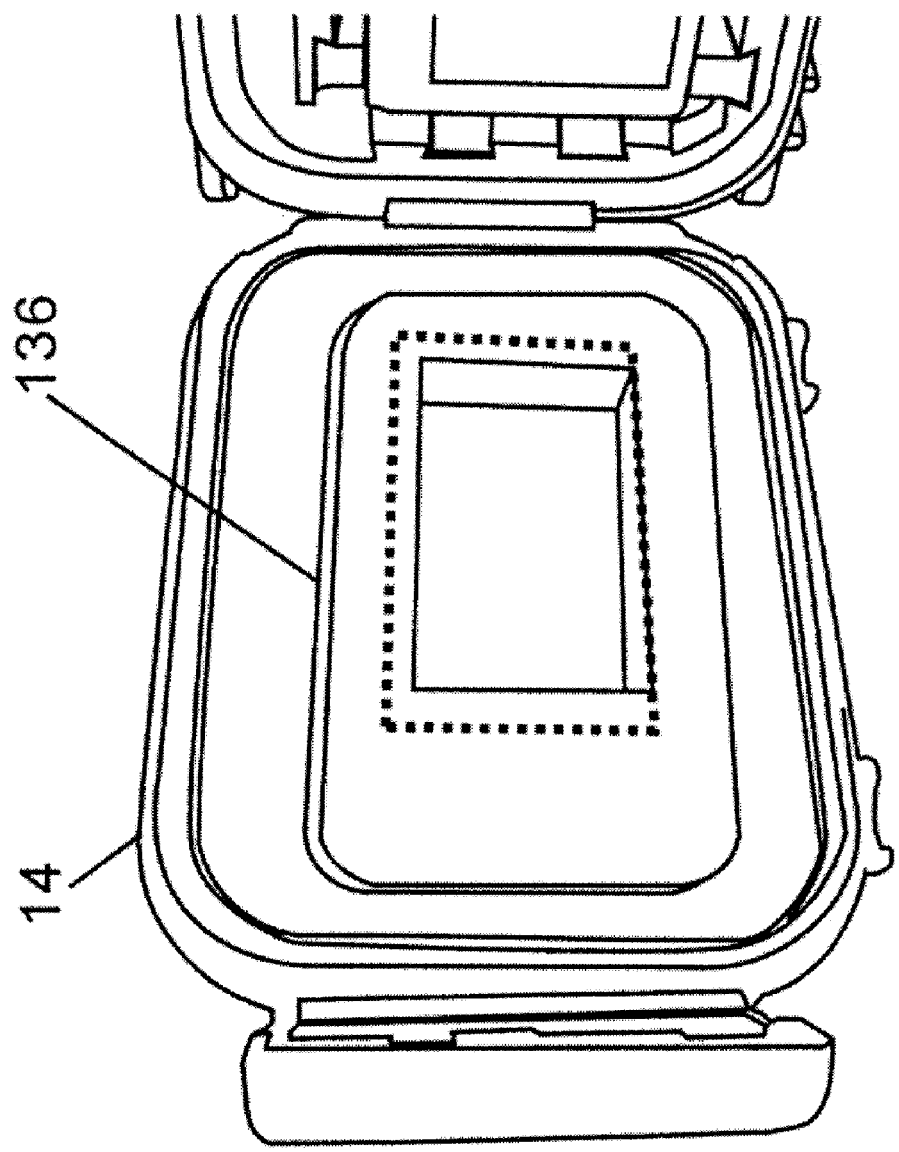
FIG. 24 shows a frame-shape cushion provided at the rear housing.

FIG. 24 shows another embodiment of a back cushion 136. The back cushion 136 can be in the shape of a generally rectangular frame. The window of the frame can be of the same size as the display of the camera, so it can act as a light hood for the camera display eliminating external light from affecting the display while viewing the camera display through the rear housing 14.

Figure 25:
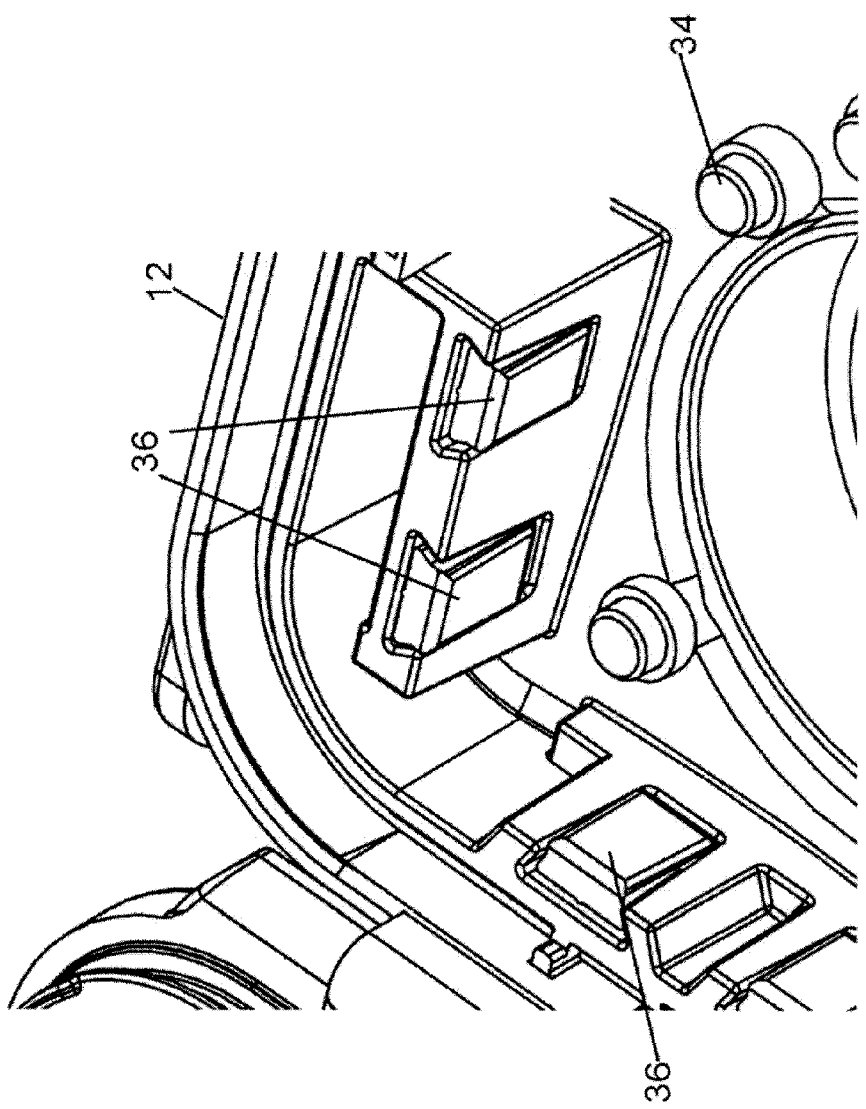
FIG. 25 shows the top and side cushions provided at the front housing.

As shown in FIGS. 2, 3 and 25, there are other locations with cushions holders for holding elastic cushions 36 to keep the camera in place. These cushions 36 are made of elastic material and may have a "fish tail" shape. These cushions 36 may be held in position by the cushion holders.

Figure 26:
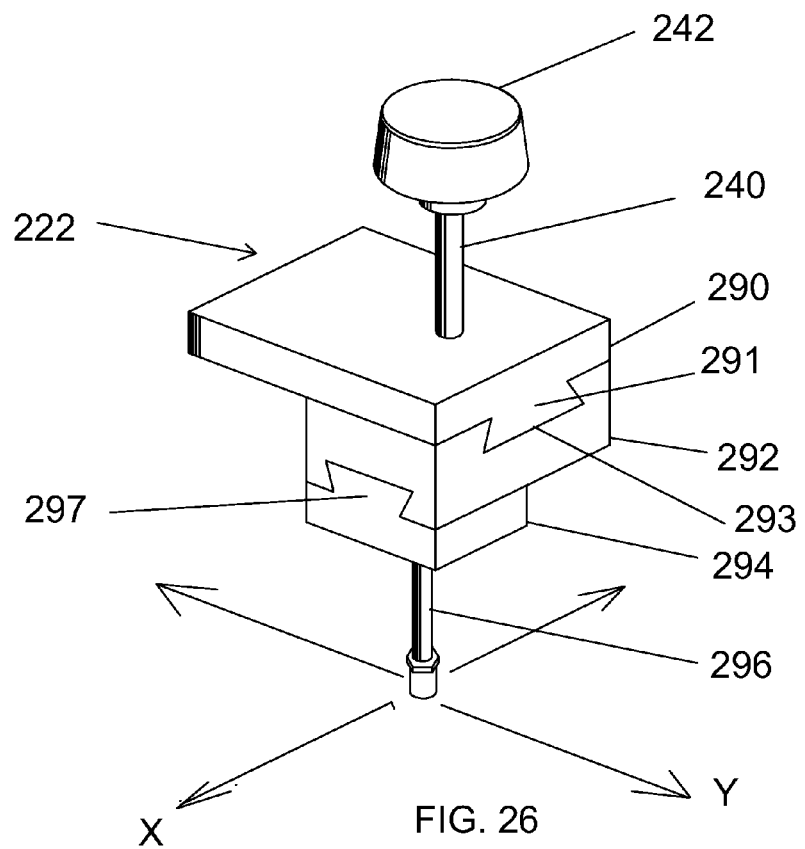
FIGS. 26-28 are perspective views showing three different positions of the probes of the shutter actuator assemblies of another embodiment.
Figure 27:
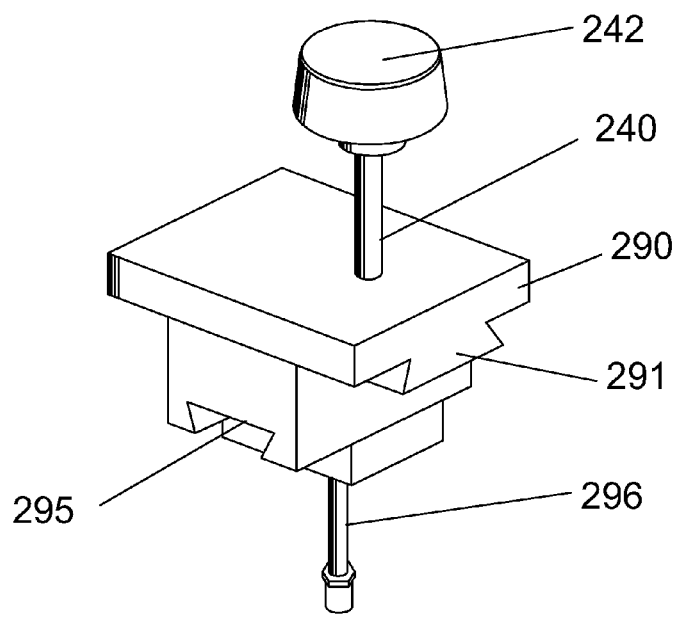
Figure 28:
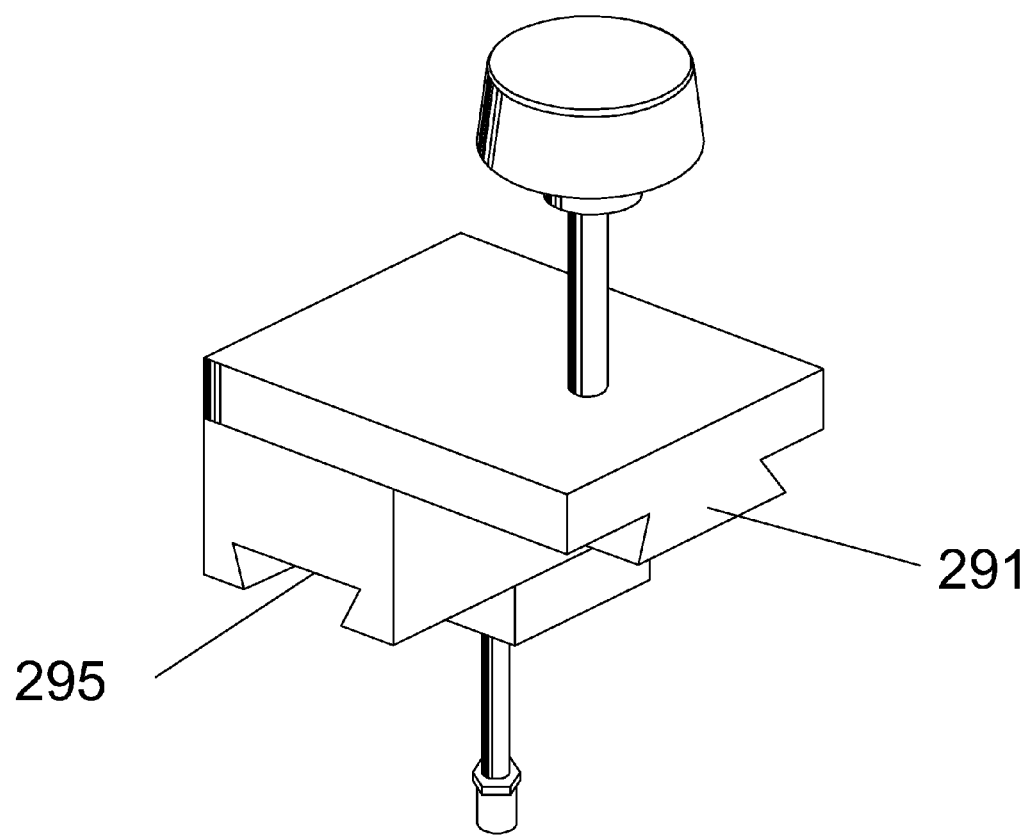

FIGS. 26-28 show another embodiment of the shutter actuator mechanism 222. The shutter actuator mechanism 222 may include an actuator shaft 240, a shutter knob 242, an actuator block 290, a first member 292 which can be moved along a Y axis, a second member 294 which can be moved along an X axis, and an adjustable probe 296.

The actuator block 290 may be in the form of a rectangular block or in other shapes. A first protrusion 291 may be formed at the bottom of the actuator block 290. A first groove 293 may be formed on the top of the first member 292. The first protrusion 291 can be slidably received in the first groove 293. The actuator block 290 and the first member 292 can be slidably connected together. The cross-section of the first protrusion 291 and the first groove 293 can be generally in the shape a trapezoid such as an isosceles trapezoid.

The first member 292 may be installed in a way that it can hang from the first protrusion 291 of the actuator block 290. The first member 292 can move freely in the Y direction along the first protrusion 291 of the actuator block 290 when the first member 292 is not locked. The first member 292 can move in the Y direction or along the Y axis on a plane generally perpendicular to an axis of the actuator shaft 240.

A second groove 295 may be formed on the bottom of the first member 292. A second protrusion 297 may be formed on the top of the second member 294. The cross section of the second groove 295 and the second protrusion 297 may be generally in the shape of a trapezoid such as an isosceles trapezoid. The second member 294 may be installed in a way that the second protrusion 297 can be slidably received in the second groove 295 of the first member 292, and the second protrusion 297 can hang from the second groove 295 of the first member 292. The second member 294 can move freely in the X direction along the groove 295 of the first member 292 when the second member 294 is not locked. The second member 294 can move in the X direction or along the X axis on a plane generally perpendicular to the Y axis.

The adjustable probe 296 may be provided on the second member 294. The probe 296 can move together with the second member 294. The position of the probe 296 can be adjusted. The probe 296 can engage at a position with a button of the camera.

The first and second members 292, 294 may take the form of a sliding block generally rectangular in shape. The first and second grooves and protrusions 291, 293, 295, 297 may be formed integrally on the actuator block 290 and the first and second members 292, 294. Although it has been shown and described that the first protrusion 291 and the first groove 293 are formed on the actuator block 290 and the first member 292 respectively, it is understood that the first protrusion 291 can be formed on the first member 292 and the first groove 293 can be formed on the actuator block 290 instead. Similarly, the second protrusion 297 can be formed on the first member 292 and the second groove 295 can be formed on the second member 294.

The actuator block 290, the first and second members 292, 294 and the probe 296 may be made of plastic, metal or other suitable materials.

Figure 29:
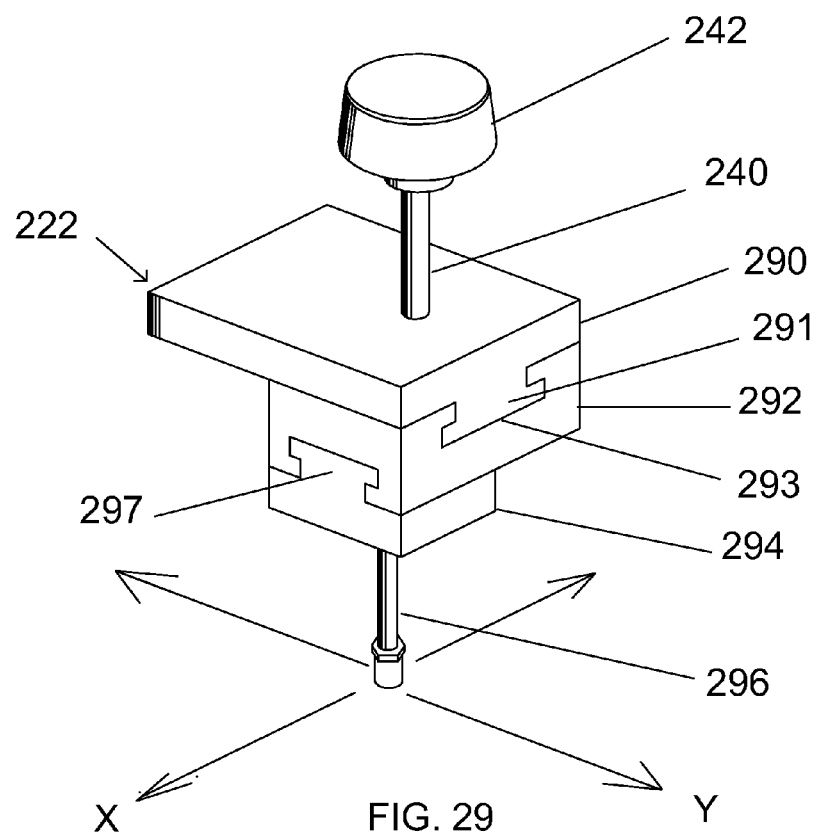
FIGS. 29-31 are perspective views showing three different positions of the probes of the shutter actuator assemblies of a further embodiment.
Figure 30:
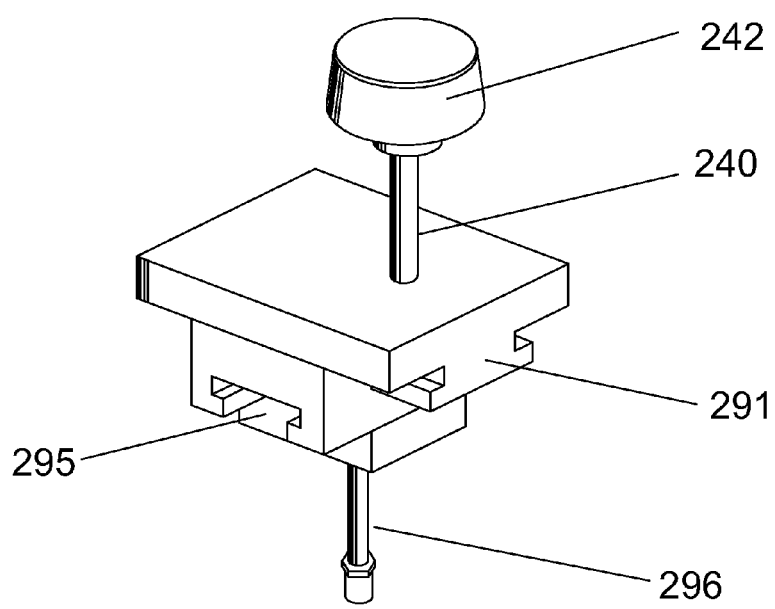
Figure 31:
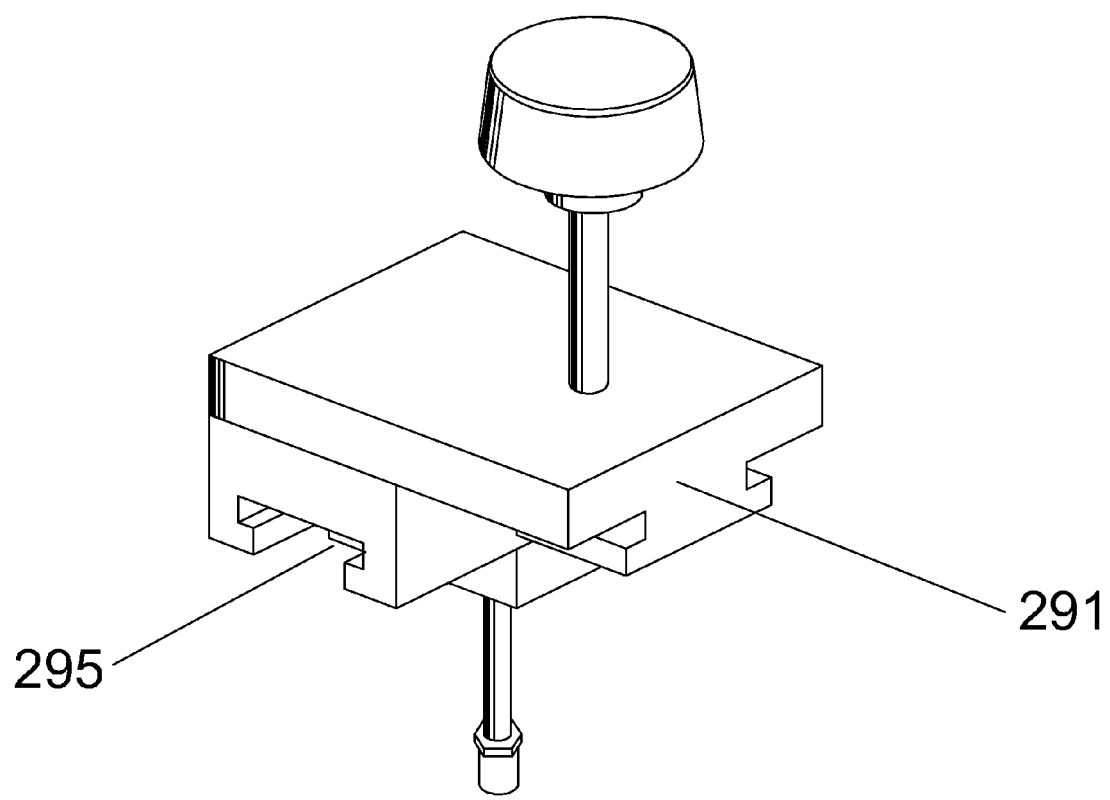

FIGS. 29-31 show a further embodiment of the shutter actuator mechanism 222. The shutter actuator mechanism 222 may include an actuator shaft 240, a shutter knob 242, an actuator block 290, a first member 292, a second member 294 and an adjustable probe 296.

The actuator block 290 may be in the form of a rectangular block or in other shapes. A first protrusion 291 may be formed at the bottom of the actuator block 290. A first groove 293 may be formed on the top of the first member 292. The first protrusion 291 can be slidably received in the first groove 293. The actuator block 290 and the first member 292 can be slidably connected together. The cross-section of the first protrusion 291 and the first groove 293 can be generally T-shaped. The cross section of the actuator block 290 can be generally H-shaped.

The first member 292 may be installed in a way that it can hang from the first protrusion 291 of the actuator block 290. The first member 292 can move freely in the Y direction along the first protrusion 291 of the actuator block 290 when the first member 292 is not locked. The first member 292 can move in the Y direction or along the Y axis on a plane generally perpendicular to an axis of the actuator shaft 240.

A second groove 295 may be formed on the bottom of the first member 292. A second protrusion 297 may be formed on the top of the second member 294. The cross section of the second groove 295 and the second protrusion 297 may be generally T-shaped. The cross section of the second member 294 can be generally H-shaped. The second member 294 may be installed in a way that the second protrusion 297 can be slidably received in the second groove 295 of the first member 292, and the second protrusion 297 can hang from the second groove 295 of the first member 292. The second member 294 can move freely in the X direction along the groove 295 of the first member 292 when the second member 294 is not locked. The second member 294 can move in the X direction or along the X axis on a plane generally perpendicular to the Y axis.

The adjustable probe 296 may be provided on the second member 294. The probe 296 can move together with the second member 294. The position of the probe 296 can be adjusted. The probe 296 can engage at a position with a button of the camera.

The first and second members 292, 294 may take the form of a sliding block generally rectangular in shape. The first and second T-shaped grooves and protrusions 291, 293, 295, 297 may be formed integrally on the actuator block 290 and the first and second members 292, 294. Although it has been shown and described that the first protrusion 291 and the first groove 293 are formed on the actuator block 290 and the first member 292 respectively, it is understood that the first protrusion 291 can be formed on the first member 292 and the first groove 293 can be formed on the actuator block 290 instead. Similarly, the second protrusion 297 can be formed on the first member 292 and the second groove 295 can be formed on the second member 294.

Figure 32:
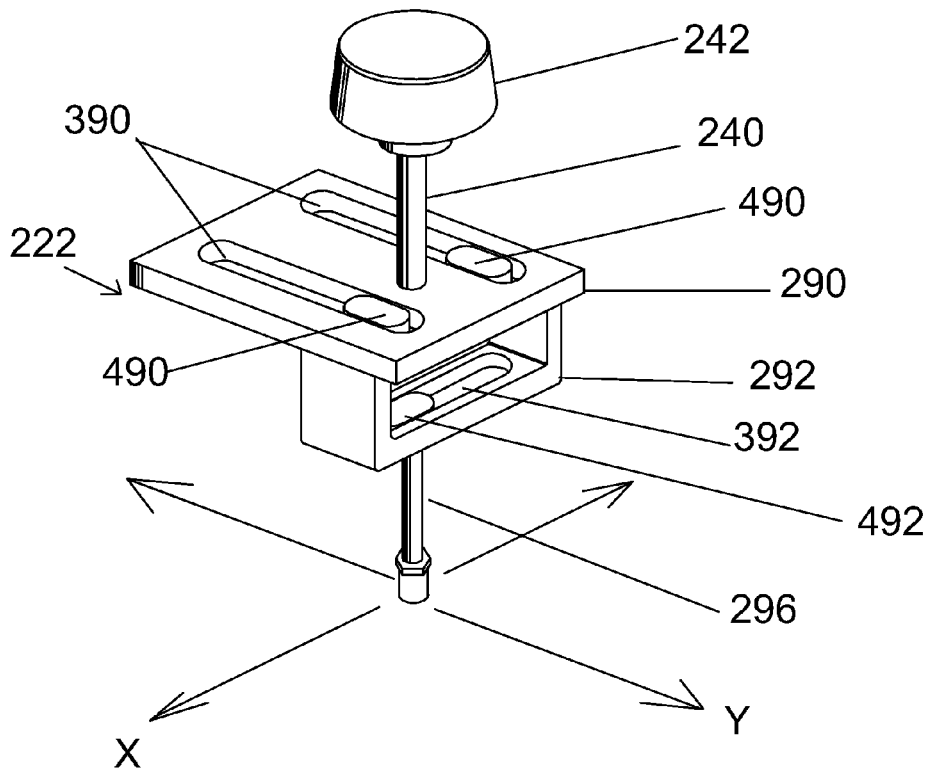
FIGS. 32-34 are perspective views showing three different positions of the probes of the shutter actuator assemblies of a further embodiment.
Figure 33:
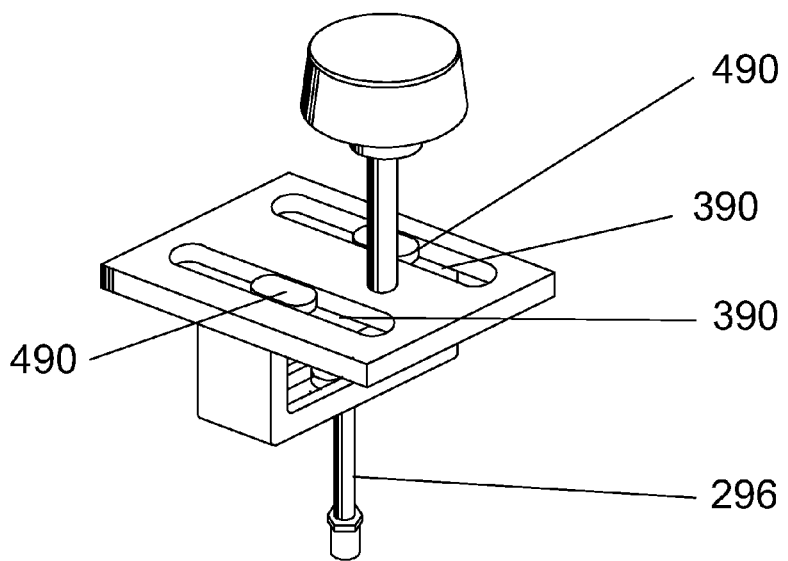
Figure 34:
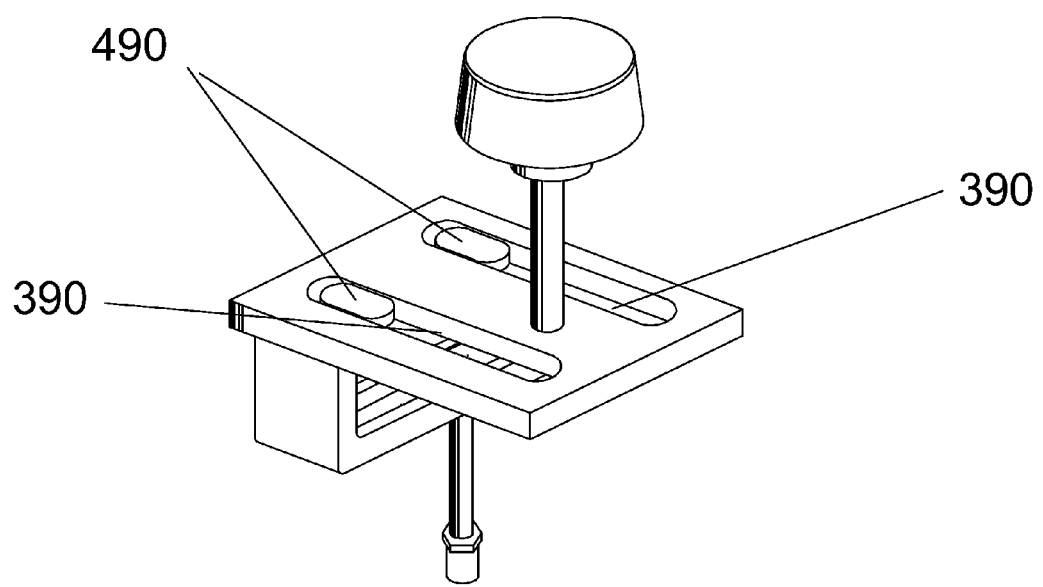

FIGS. 32-34 show yet another embodiment of the shutter actuator mechanism 222. The shutter actuator mechanism 222 may include an actuator shaft 240, a shutter knob 242, an actuator block 290, a sliding member 292 and a sliding probe 296.

The actuator block 290 may be in the form of a rectangular block or in other shapes. The actuator block 290 may be formed with two slots 390. The sliding member 292 may be formed with two sliders 490 hanging from and slidable along the two slots 390 of the actuator block 290 respectively. The sliding member 292 can move freely in the Y direction along the two slots 390. The sliding member 292 can move in the Y direction or along the Y axis on a plane generally perpendicular to an axis of the actuator shaft 240.

The sliding member 292 may be formed with a slot 392. The sliding probe 296 may be formed with a slider 492 hanging from and slidable along the slot 392 of the sliding member 292. The sliding probe 296 can slide freely in an X direction along the slot 392. The probe 296 can engage at a position with a button of the camera.

The actuator block 290, the sliding member 292 and the sliding probe 296 may be made of plastic, metal or other suitable materials While the user-configurable waterproof camera case disclosed in the present patent application has been shown and described with particular references to a number of preferred embodiments thereof, it should be noted that various other changes or modifications may be made without departing from the scope of the appending claims.

What is claimed is:

1. A user-configurable waterproof camera case comprising:
   a housing for sealingly holding different models of camera therein;
   an actuating shaft extending through an opening of the housing;
   an actuator block connected to an inner end of the actuating shaft;
   a first member slidably connected to the actuator block along a first axis generally perpendicular to an axis of the actuating shaft;
   a second member slidably connected to the first member along a second axis generally perpendicular to the first axis; and
   an adjustable probe provided on the second member at a position engageable with a button of the camera;
   wherein the actuator block is formed with two slots, and the first member is formed with two sliders hanging from and slidable along the two slots of the actuator block respectively.

2. The user-configurable waterproof camera case as claimed in claim 1, wherein the connection between the actuator block and the first member and the connection between the first and second members are groove-and-protrusion connections.

3. The user-configurable waterproof camera case as claimed in claim 1, wherein the connection between the actuator block and the first member and the connection between the first and second members are slot-and-slider connections.

4. The user-configurable waterproof camera case as claimed in claim 1, wherein each of the first and second members is in the form of a sliding block.

5. The user-configurable waterproof camera case as claimed in claim 1, wherein one of the actuator block and the first member is formed with a first groove, and the other one of the actuator block and the first member is formed with a first protrusion slidably received in the first groove; and wherein one of the first and second members is formed with a second groove, and the other one of the first and second members is formed with a second protrusion slidably received in the second groove.

6. The user-configurable waterproof camera case as claimed in claim 5, wherein the first and second grooves and protrusions are generally in the shape of a trapezoid in cross section.

7. The user-configurable waterproof camera case as claimed in claim 5, wherein the first and second grooves and protrusions are generally T-shaped in cross section.

8. The user-configurable waterproof camera case as claimed in claim 1, wherein the actuator block and the second member are generally H-shaped in cross section.

9. The user-configurable waterproof camera case as claimed in claim 1, wherein the first member is formed with a slot, and the second member is formed with a slider hanging from and slidable along the slot of the first member.

10. The user-configurable waterproof camera case as claimed in claim 1, wherein the actuator block is formed with two grooves along two opposite sides thereof, and the first member is formed with two sliders hanging from and slidable along the two grooves of the actuator block respectively.

11. The user-configurable waterproof camera case as claimed in claim 10, wherein the first member is formed with a slot, and the second member is formed with a slider hanging from and slidable along the slot of the first member.

12. The user-configurable waterproof camera case as claimed in claim 1, wherein the probe comprises a threaded portion threadably engaged with a nut for locking the probe in a fixed position relative to the actuator block.

13. A user-configurable waterproof camera case comprising:
   a housing for sealingly holding different models of camera therein;
   an actuating shaft extending through an opening of the housing;
   an actuator block connected to an inner end of the actuating shaft;
   a sliding member slidably connected to the actuator block along a first axis generally perpendicular to an axis of the actuating shaft; and
   a sliding probe slidably connected to the sliding member along a second axis generally perpendicular to the first axis, the probe being adjustable to a position engageable with a button of the camera;
   wherein the actuator block is formed with two slots, and the sliding member is formed with two sliders hanging from and slidable along the two slots of the actuator block respectively.

14. The user-configurable waterproof camera case as claimed in claim 13, wherein the sliding member is formed with a slot, and the sliding probe is formed with a slider hanging from and slidable along the slot of the sliding member.

15. The user-configurable waterproof camera case as claimed in claim 13, wherein the actuator block is formed with two grooves along two opposite sides thereof, and the sliding member is formed with two sliders hanging from and slidable along the two grooves of the actuator block respectively.

16. The user-configurable waterproof camera case as claimed in claim 15, wherein the sliding member is formed with a slot, and the sliding probe is formed with a slider hanging from and slidable along the slot of the sliding member.

17. The user-configurable waterproof camera case as claimed in claim 13, wherein the probe comprises a threaded portion threadably engaged with a nut for locking the probe in a fixed position relative to the actuator block.

\* \* \* \* \*